(12) United States Patent
McGough

(10) Patent No.: US 8,144,874 B2
(45) Date of Patent: *Mar. 27, 2012

(54) METHOD FOR OBTAINING KEY FOR USE IN SECURE COMMUNICATIONS OVER A NETWORK AND APPARATUS FOR PROVIDING SAME

(75) Inventor: R. Paul McGough, Centreville, VA (US)

(73) Assignee: Paul McGough, Centreville, VA (US)

( * ) Notice: Subject to any disclaimer, the term of this patent is extended or adjusted under 35 U.S.C. 154(b) by 1223 days.

This patent is subject to a terminal disclaimer.

(21) Appl. No.: 11/899,741

(22) Filed: Sep. 6, 2007

(65) Prior Publication Data

US 2008/0056501 A1 Mar. 6, 2008

Related U.S. Application Data

(60) Provisional application No. 60/842,595, filed on Sep. 6, 2006.

(51) Int. Cl.
*H04L 9/00* (2006.01)

(52) U.S. Cl. ........ 380/277; 380/278; 380/279; 380/280; 705/51; 705/54; 705/57; 709/227; 709/228; 713/156; 713/168; 713/175; 713/176; 713/150; 713/177; 713/171

(58) Field of Classification Search .................... 713/171
See application file for complete search history.

(56) References Cited

U.S. PATENT DOCUMENTS

| | | |
|---|---|---|
| 4,675,477 A | 6/1987 | Thornwall |
| 4,797,921 A | 1/1989 | Shiraishi |
| 5,164,986 A | 11/1992 | Bright |
| 5,297,207 A | 3/1994 | Degele |
| 5,657,390 A | 8/1997 | Elgamal et al. |
| 5,796,830 A | 8/1998 | Johnson et al. |
| 5,825,890 A | 10/1998 | Elgamal et al. |
| 5,832,087 A | 11/1998 | Hawthorne |
| 6,002,769 A | 12/1999 | McGough |
| 6,035,402 A | 3/2000 | Vaeth et al. |
| 6,058,189 A | 5/2000 | McGough |
| 6,269,164 B1 | 7/2001 | Pires |
| 6,308,277 B1 | 10/2001 | Vaeth et al. |
| 6,415,032 B1 | 7/2002 | Doland |
| 6,445,797 B1 | 9/2002 | McGough |

(Continued)

*Primary Examiner* — Nathan Flynn
*Assistant Examiner* — Bryan Wright
(74) *Attorney, Agent, or Firm* — Michael P. Fortkort, Esq.

(57) ABSTRACT

A system and method comprising a computer useable medium having computer readable program code means embodied therein for authenticating and encrypting and decrypting information transferred over a public network between a client application program running in a client computer and a server application program running in a server computer and a directory service application program running in a server computer. A method for obtaining a session master key by an application from a server includes sending an open request to the server for the session master key and receiving a first reply by the application from the server with a first portion of the session master key. The first reply identifies a directory server from which a second portion of the session master key may be obtained. The application sends an open request to the directory server specified by the server in the first reply for the second portion of the session master key and receives it from the directory server. The session master key is generated by the application using the first portion of the session master key received from the server and the second portion of the session master key received from the directory server.

36 Claims, 10 Drawing Sheets

U.S. PATENT DOCUMENTS

| | | |
|---|---|---|
| 6,732,271 B1 | 5/2004 | Sako et al. |
| 6,891,950 B1 | 5/2005 | Oomori et al. |
| 6,901,510 B1 | 5/2005 | Srivastava |
| 6,983,382 B1 | 1/2006 | Hartke et al. |
| 7,111,162 B1 | 9/2006 | Bagepalli et al. |
| 7,181,017 B1 * | 2/2007 | Nagel et al. .................. 380/282 |
| 7,221,961 B1 * | 5/2007 | Fukumoto et al. ............ 455/557 |
| 7,477,748 B2 * | 1/2009 | Schmidt ........................ 380/279 |
| 2004/0039924 A1 | 2/2004 | Baldwin et al. |
| 2004/0098588 A1 | 5/2004 | Ohba et al. |
| 2004/0266533 A1 | 12/2004 | Gentles et al. |
| 2006/0274899 A1 * | 12/2006 | Zhu et al. ..................... 380/281 |

\* cited by examiner

10
Circle of Trust

Handshake Flow for a New Session

METHOD FOR OBTAINING KEY FOR USE IN SECURE COMMUNICATIONS OVER A NETWORK AND APPARATUS FOR PROVIDING SAME

RELATED APPLICATION

This application claims the benefit of U.S. Provisional Application No. 60/842,595 filed Sep. 6, 2006 by the same inventor.

FIELD OF THE INVENTION

The present invention relates generally to systems and methods for generating Internet traffic to websites to provide advertising revenue for the websites, and more particularly to a system and method for generating Internet traffic to a website that provides a service to both browsers and servers.

BACKGROUND OF THE INVENTION

One revenue model for an Internet web site is to generate traffic to the website and then charge advertisers to advertise on the website. The real trick to this model is generating sufficient traffic to be able to entice advertisers to place their advertisements on the web site. Additionally, the more traffic that a web site generates the higher fees the web site operator can charge the advertisers.

Whereas great strides have been made in the security of public networks, there is one totally neglected aspect: public scrutiny. In a public network, the procedure for creating a private, secure channel within the public architecture is well defined. The procedure involves the provision of trust brokered between two unique parties by a trusted third party. The technologies and methods for provision of this trust rely exclusively on the mathematic formulation of exchanged information. While these methods are currently viewed as being difficult with which to interfere, the concept of being able to publicly check on the provision of the information is completely lacking.

There is no easy, public way to "check the badge number" of the electronic "police officer" showing it to you. There is no way to scrutinize the trusted third party provider of the electronic exchange information or scrutinize the conditions under which they became a provider. In essence, there is no easy publicly verifiable method or technology that can be used in real-time to verify and validate the mathematic information presentation to be certain that the security and privacy of the connection is as created.

The present invention is therefore directed to the problem of developing a method and apparatus for generating sufficient traffic to a web site and to improve the authentication practices available on the Internet.

SUMMARY OF THE INVENTION

The present invention solves these and other problems by providing a novel mathematic exchange technique within a novel trust model and a method for providing a trusted intermediary to enable secure authentication and transfer of encryption keys between a server and a browser.

According to one aspect, the present invention relates to systems and methods for the secure exchange of numeric authentication and encryption keys and for authenticated encryption of any accompanying message content. An exemplary embodiment of the method is applied at the socket layer of the network, and is an improvement on the commonly referred to Secure Sockets Layer (SSL) and Transport Layer Security (TLS) technology. The inventor terms the new method of the present invention, Secure Sockets Layer eXtended (SSLX), which method is several hundred times faster delivering a single-pass handshake and per transmission session key generation and use.

The performance improvement allows a trusted third party to function not only as a provider of initial authentication information to network participants but also as a provider in real-time of new authentication and encryption key information between the participants per session. This completely re-aligns the provision of third party trust from reliance on the static, unchanging-for-years initial authentication information and its mathematic presentation as currently offered by SSL/TLS, to the ability of participants to validate trust tokens in real-time at any time during their connection. Public scrutiny is the linchpin of global society and the lack of it in the electronic world is a stifling hindrance to new frontiers.

According to one aspect of the present invention, an exemplary embodiment of a method for obtaining a session master key by an application executing on a computer from a server over a network includes sending by the application an open request to the server for the session master key and receiving a first reply by the application from the server with a first portion of the session master key. The first reply identifies a directory server from which a second portion of the session master key may be obtained. The application sends an open request to the directory server specified by the server in the first reply for the second portion of the session master key and receives the second portion of the session master key from the directory server. The open request from the application to the server may include a public key, in which case the first reply from the server to the application includes the first portion of the session master key encrypted with the public key. The open request from the application to the directory server may also include a public key, in which case the second portion of the session master key received from the directory server is encrypted with the public key. The open request from the application to the directory server may include a designation either to: (i) wrap the second portion of the session master key in an SSLX-EA exchange using the application directory server key obtained by the application from the directory server; or (ii) encrypt the second portion of the session master key using a public key provided by the application in the open request to the directory server. The application generates the session master key using the first portion of the session master key received from the server and the second portion of the session master key received from the directory server. The server sends a second reply to the directory server with the second portion of the session master key wrapped in an SSLX-EA exchange using a server directory server key obtained by the server from the directory server. Messages from the application to the server are sent wrapped in an SSLX-EA exchange using the session master key and messages from the server to the application are also wrapped in the SSLX-EA exchange using the session master key. The server directory server key may be obtained by the server during a verified set up operation with the directory server. Similarly, the application directory server key may be obtained by the application during a verified set up operation with the directory server. The open request from the application to the server may include a list of one or more directory servers with which the application has performed a verification process. Similarly, the first reply from the server to the application may also include a list of one or more directory servers with which the server has performed a verification process.

According to another aspect of the present invention, an exemplary embodiment of a method for transferring a session master key from a server to an application executing on a computer over a network includes receiving an open request by the server from the application for the session master key, sending a first reply to the application with a first portion of the session master key, and sending a second reply to a directory server with a second portion of the session master key wrapped in an SSLX-EA exchange using a server directory server key obtained by the server from the directory server. The application sends an open request to the directory server specified by the server in the first reply for the second portion of the session master key. The directory server sends the second portion of the session master key to the application. The session master key is generated by the application using the first portion received from the server and the second portion received from the directory server. The open request from the application to the server may include a list of one or more directory servers with which the application has performed a verification process. The first reply from the server to the application may also include a list of one or more directory servers with which the server has performed a verification process. The open request received by the server from the application may include a public key, in which case the first reply sent from the server to the application includes the first portion of the session master key encrypted with the public key. The open request sent by the application to the directory server may also include a public key, in which case the second portion of the session master key sent from the directory server to the application is encrypted with the public key. The open request sent by the application to the directory server may include a designation either to: (i) wrap the second portion of the session master key in an SSLX-EA exchange using the application directory server key obtained by the application from the directory server; or (ii) encrypt the second portion of the session master key using a public key provided by the application in the open request to the directory server. Messages to the application from the server are sent wrapped in an SSLX-EA exchange using the session master key and messages received from the application are wrapped in the SSLX-EA exchange using the session master key. The server directory server key is obtained by the server during a verified set up operation with the directory server. The application directory server key is obtained by the application during a verified set up operation with the directory server.

According to still another aspect of the present invention, an exemplary embodiment of a method for verifying a computer on a network includes receiving an open request by a directory service from the computer for a directory service key, wherein the request includes an authentication request value, sending by the directory service a single reply with the directory service key encrypted using a public key included in the open request sent by the computer if the authentication request value designates a public key option, sending by the directory service a single message including the directory service key via an out-of-band communication path specified in the request from the computer if the authentication request value designates an out-of-band communication path option, and sending by the directory service a first reply back to the computer with a first portion of the directory service key, and a second reply via an out-of-band communication path specified in the request from the computer with the second portion of the directory service key if the authentication request value designates a combination of both public key and the out-of-band communication path option. The single message comprises the directory service key encrypted using a public key included in the request from the computer to the directory service. The second reply comprises the directory service key encrypted using a public key included in the request from the computer to the directory service. A confirmation message is received from the computer by the directory server, which confirmation message is wrapped in an SSLX-EA exchange using the directory service key.

According to yet another aspect of the present invention, an exemplary embodiment of a method for obtaining a trusted key from a trusted third party for use in communicating securely includes sending an open request to the trusted third party for the trusted key, wherein the request includes an authentication request value, and the authentication request value designates a delivery option for the trusted key, receiving the trusted key from the trusted third party via one or more communication paths based on the designation in the authentication request value, and sending a confirmation message to the trusted third party wrapped in an SSLX-EA exchange using the trusted key. A public and private key pair is created at the beginning of this process. A public key may be included in the open request, in which case the public key is used to encrypt the trusted key when sending the trusted key over said one or more communication paths. If the authentication request value designates a public key option, the trusted third party sends a single reply with the trusted key wrapped using the public key sent to the trusted third party in the open request. If the authentication request value designates an out-of band communication path option, the trusted third party sends a single reply with the trusted key sent via an out-of-band communication path to an address specified in the authentication request value. If the authentication request value designates a combination of both public key and out-of-band communication path, the trusted third party sends a first reply with a first portion of the trusted key encrypted using the public key, and a second reply via an out-of-band communication path and an address specified in the authentication request with the second portion of the trusted key. The trusted third party decrypts the confirmation message. If the confirmation message does not properly decrypt, the trusted third party sends a denied message encrypted with the public key and the denied message is decrypted by the computer and the trusted third party is removed from a verified setup list. After receiving the trusted key, the computer maintains a list of all trusted third parties with which the computer has received trusted keys, along with one or more associated trusted keys, and includes the list in a message to another computer when interacting with said another computer during an authentication process.

According to still another aspect of the present invention, an exemplary embodiment of an apparatus for serving as a trusted intermediary between computers communicating securely over a network includes a server and a database coupled to the server to store pertinent information to securely communicate with any particular directory member. The pertinent information includes a directory service key associated with each particular directory member. A known static IP address is associated with the server. An application executes on the server. The server routes real-time requests from browsers to web servers and replies from web servers to browsers. The requests and replies are secured with a requestor-generated public key or with a trusted key in an SSLX-EA exchange if the requestor has performed a verified set up with the server. Each of said replies includes only a portion of information for the requester to combine and verify that said each reply and a web-connected location are identical. A remaining portion of information is provided directly from the web site to the requestor using a requestor-generated public key to encrypt a remaining portion of information.

These and other features and advantages of the present invention will become more apparent from the following description of exemplary embodiments thereof, as illustrated in the accompanying drawings.

DETAILED DESCRIPTION

Figure 1:
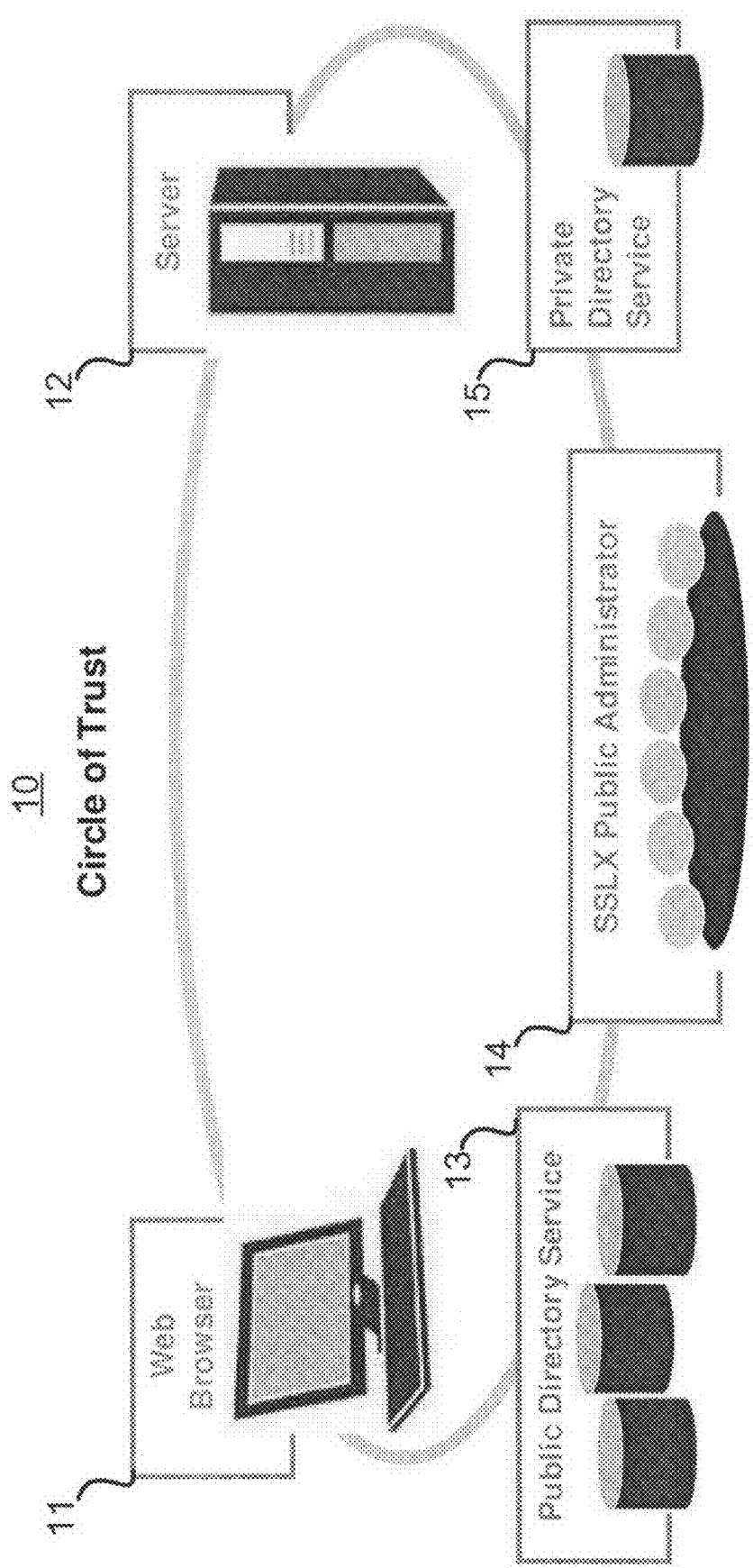
FIG. 1 is a diagram of a computer network with the SSLX components according to one aspect of the present invention.

The present invention comprises a novel process and related computer program embodied in a computer readable and usable medium for ensuring private communications between application programs running on different computers. Descriptions of specific applications are provided only as examples. The present invention is not intended to be limited to the embodiments and examples shown, but is to be accorded the widest scope consistent with the principles and features disclosed herein.

Before describing the present invention, it should be noted that simple decryption using a shared key does not in and of itself provide authentication. This is due to the fact that when the shared key is discovered (through any means including brute force of the key space), the knowledge of the key leads to the ability to both decrypt every message from then on, as well as impersonate the key owner by encrypting false messages; SSL authenticates only once at the start of any session, and therefore has this simple decryption vulnerability.

The present invention, which provides embedded authentication in the encryption process, termed SSLX-EA, begins with a shared authenticated key that is provided out-of-band. Then instead of using the key for simple decryption (with its vulnerabilities), SSLX-EA uses the ability to decrypt properly as probabilistic authentication because the shared key is not used directly for decryption but rather to generate, through a one-way process, a unique message key for every message. Should an adversary discover one of the message keys and properly decrypt a single message, this does not lead to the ability to decrypt the next message nor impersonate a sender and generate proper SSLX-EA output. SSLX-EA keeps the sanctity of the original shared key (K1) as an authentication token because knowing the random number (R) and the message key (W) does not lead to the alphabet used (A) or to the original shared key (K1). Moreover, knowledge of any message key (W) does not lead to the next or any future message keys (W). SSLX-EA closes the simple-decryption hole that exists in SSL by adding a fast authentication mechanism to every communication.

As used herein, an application can be any software program or operating system. Moreover, web server or servers can be any device coupled to a network capable of communicating with another device or application on the network.

SSLX as a process for embedded authentication and data encryption may be placed at any level of a communications network. It can work at the application layer placed into web browsers and web servers; and work as well all the way down through the session, transport and network layer when placed into an OS, router or any network switch device.

The features of speed, low-power consumption and small code size allow SSLX to work in wireless architectures (voice and data) as well as any sensor or other remote network communications platforms. SSLX is a protocol independent of the communications architecture, allowing it to work anywhere network participants need secure, private messaging.

A. The World Wide Web Browser—Server Model

SSLX is available to provide authenticated and secure communications in a World Wide Web architecture. Once in place, SSLX may operate as a software component of a web server and within the software web browser application. Another software application resides at a third party, which constitutes a respected, independent public party that brokers trust and helps provide the secure channel between the browser and the server. The third party is called a Directory Service (DS).

Directory Services, as will be shown, can operate in two different ways: one as an open entity available to the public, or as a private entity operating to broker trust between private servers and a closed-community of web browsers. The private entity operating to broker trust between private servers and a closed communication of web browsers is called a Private Directory Service. The last piece of the SSLX web example is a SSPX Public Administrator (PA), which is another public body responsible for managing the public Directory Services; the PA does not provide any part in brokering the electronic mechanisms between the three other parties.

All of the parties work in concert to provide the Circle of Trust 10 as shown in FIG. 1. A web browser 11, server 12, public directory service 13, SSLX Public Administrator 14 and Private Directory Service 15 all work in concert to implement and operate a circle of trust 10, as will be described in more detail below.

Normal SSLX Operation (Trusted)

Normal communications flow for SSLX is used when both the browser and the server share SSLX-EA (Embedded Authentication) Session Master Keys (SMKs). The SSLX-EA is explained below. The browser obtains the SMK through one of two methods:

1. Performing an SSLX Authentication Handshake; or
2. Performing an out of band process that entails the end-user authenticating to the server owner, and the server creates and stores the key associated with this particular browser, while the browser owner enters the key into the browser application.

Normal Operation

Figure 2:
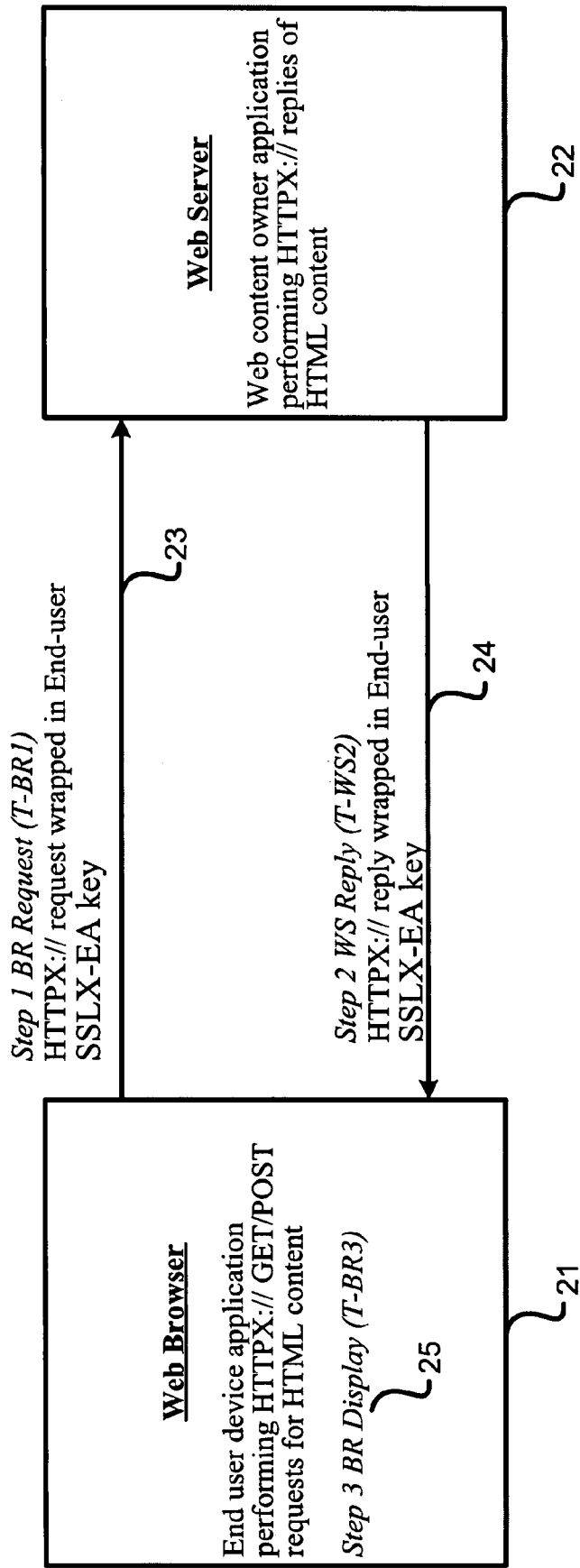
FIG. 2 is a diagram of the normal SSLX trusted communication after brokered third part trust from a Directory Service (DS) according to another aspect of the present invention.

Referring to FIG. 2, Normal Operation 20 occurs when a web browser 21 sends every GET and POST request to the web server 22 wrapped in an SSLX-EA exchange (T-BR1) 23. As used herein, "wrapped in an SSLX-EA exchange" means using a message key to encrypt the request, which message key is generated from a session master key (SMK) combined with a random number that is included with the encrypted request to the server. The exact details of this SSLX-EA technique are set forth below. This process is also called a one pass key generation probabilistic authentication process. In short, the browser 21 authenticates each and every GET and POST request as well as encrypting it. The web server 22 replies using the same known SMK with content wrapped in an SSLX-EA exchange (T-WS2) 24. Similarly to the browser, the server authenticates each and every response to the browser as well as encrypting the content being transmitted. The web browser 21 then unwraps the reply content and displays it to the user (T-BR3) 25.

Each and every exchange can be uniquely encrypted and delivered; or each round-trip (including request and reply) can be uniquely encrypted. A setting on the server is provided that defines an SSLX-EA session length. An exemplary embodiment of a setting for an SSLX session length in a web architecture comprises one HTML page so that each page has a unique SMK exchange and message key to include the request and reply of all the objects on that page.

At each session, the SSLX communications traffic is quite simple: the web browser 21 wraps each request in either an SSLX-EA key exchange and ciphertext (if session start) or cipher text only (if inside session) and sends it to the trusted web server 22. The server 22 either unwraps the SSLX-EA key exchange and decrypts the request, or simply decrypts the request, then processes the request to obtain the content, then wraps the reply in either an SSLX-EA key exchange (if session length is set for every communication) or cipher text using the session key and returns it to the browser 21. The browser 21 then unwraps the content, performing an SSLX-EA key exchange decrypt or just a cipher decrypt, and processes it. SSLX uses any standard electronic cipher to encrypt and decrypt the cipher text.

SSLX Authentication Handshake (AH)

The SSLX Authentication Handshake process is used when only the server has SSLX-EA keys to start. The SSLX Authentication Handshake is an operation at the start of an anonymous web surfer connection to a web site page where sensitive/private/secure information will be exchanged and the surfer will be shown proof that the web site connected to is, indeed, the intended recipient of the information. This is the initialization of secure communications between the browser and the server.

The Authentication Handshake involves checking that the server is the server it is supposed to be. There are only two logical ways to do this:

1. Previous knowledge; or
2. Ask a third party—preferably a trusted one.

The first method implies a previous relationship—which is the Trusted Operation mode, with both parties providing proof through their previous encounter (key establishment out of band).

The SSLX implementation of the "ask someone" third party is performed by what is termed a Directory Service/Server (DS). An SSLX DS functions as a public, known entity that holds the pertinent information to (securely) communicate with any particular directory member. An SSLX DS in a web infrastructure would have a known static IP address, operating a simple SSLX application and database for routing real-time requests and replies. The requests are secured with a requestor-generated public key or with a DS SSLX-EA key if the browser has performed a Verified Set Up (VSU). The replies are secured in the same manner, and are half of the necessary information for the requestor to combine and verify that the reply and the web-connected location are one and the same. The other half of the information is provided directly from the web site to the requester in the requestor-generated public key.

The assurance of (trust in) the open public DS is based on the following:

Out-of-band verification of the DS location can be made;

Real-time spoofing/manipulating both the site location and the DS location to/from the browser is difficult to accomplish, and requires first 'breaking' the Verified Server Set Up process (which requires internal trusted human malice to accomplish);

The information provided to the DS can only have come from a pre-registered SSLX server; the information provided by the DS can be delivered securely in either a pre-registered not-vulnerable (SSLX-EA) or non-registered minimally vulnerable manner (public key);

The only location where the entire communications information can be assimilated is at the requester—the DS never stores any information about the requestor nor the site request; and DS connectivity can be made at a page location without any security requirement so that no session information is exchanged until after additional trust activity can be accomplished by checking specific site content.

All of these together form a solid secure means for an anonymous web surfer to authenticate any SSLX participating server/web site.

The Directory Service/Server (DS) is an important component of third party trust that is implemented in a different, more scalable and less exclusive manner than Certificate Authorities (CAs) in SSL/TLS—they also form a more basic and less formal function of simply being a trusted switch as opposed to a registration and repository "authority." The DS network is more like a series of Information Desks that all know about their particular building and members, instead of a hierarchical authority network of CAs that are akin to store security offices. Since Ecommerce trust in an identity exchange is simply a verification that one is buying from a real store on the third floor of a particular building as displayed on the web site, it's much easier and just as valid to ask the helpful attendant at the Info Desk, than it is to go find the security officer.

The DS network in SSLX does not require interconnectivity of DS operators. In order to be assured that a DS is operating in a trustworthy manner, there is an outside trusted SSLX Public Administrator (PA). The PA is a:

Respected, independent third-party that provides governance of worldwide Public Directory Services;

Allocates operational licenses for DSs, maintaining control so that public assurance of a DS can be verified;

Provides quality control and compliance standards for DS; and

Authority for DS, lookup, validating DS for users.

The purpose of the DS is to Validate a web server; a direct result of their presence in the Authentication Handshake is that the network of DS switches then enables multiple security levels for the end user. The listed options for the AH are included to handle different means of communicating with known and unknown DSs. This results in SSLX being able to offer different security levels. The risk associated with even the lowest level of security provided by the AH options are well defined and limited; the risk at the highest level is almost non-existent—there are out-of-band options as backup of the only vulnerabilities.

The levels are based on three different use models from the end-user browser perspective. The server will always have participated in at least one Directory Service Verified Set Up, so it is able to perform at the highest level at all times—active server management in setting up with more and multiple DSs will allow the server to participate more fully with the browser and not lower the browser's security expectation (setting), since the end-user has the ability to choose which way it would like the server to reply through the DS.

Since all servers must perform at least one Verified Setup, there is at minimum one public DS that must exist. Should there only be one in any architecture, that DS will be called the Common Directory Service (CDS).

The SSLX Security Levels:
1. High—Both the server and the browser have executed the one-time Verified Set Up for various Directory Services, with at least one in common; and
2. Medium—There are two scenarios for medium security:
   a. The browser has asked to use a particular DS with which the server has not verified so the Server's DS will be used with browser public key communication; or
   b. The browser has not verified with any DS, but has been set for this level so it will communicate with any particular DS using public keys; and
Low—The browser and the server will communicate directly without any DS intermediary using public keys (susceptible to a Man in the Middle (MITM) attack—this level of security is akin to the security of regular house locks: break-ins are rare, but they do happen).

Private DSs can be established where end-users are invited to perform a Verified Set Up (VSU) and these do not have a listing in the PA. For these, the web content owner is mandating that the only information that will be dispersed is using the High Security Level for any communication—in this case, the server will be set to not reply to any browser that has not undergone the VSU with the private DS.

Operation.

Figure 3:
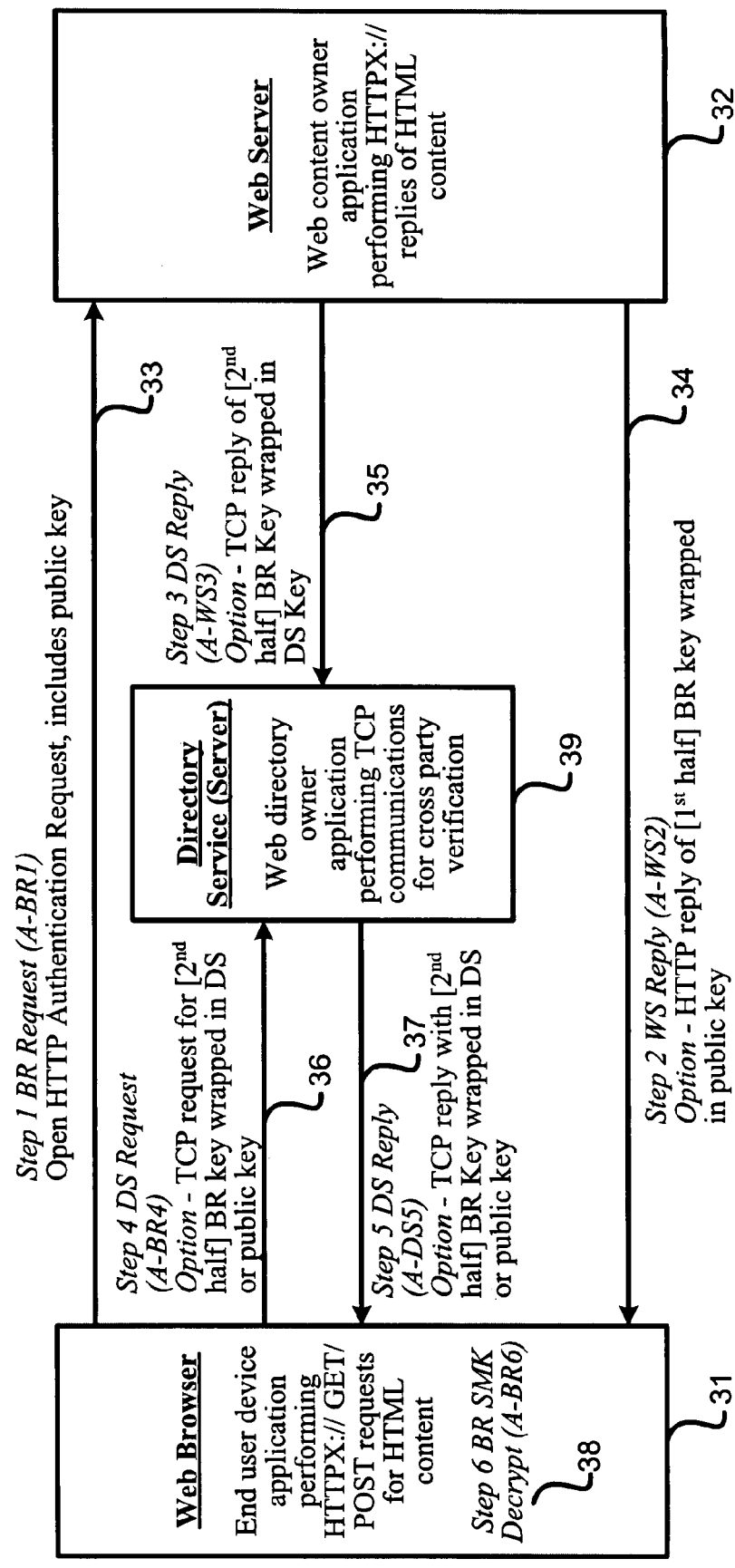
FIG. 3 is a diagram of the SSLX Authentication Handshake according to yet another aspect of the present invention.

Referring to FIG. 3, the following is a description of the Authentication Handshake 30. The Authentication Handshake (AH) 30 occurs when a web browser 31 first creates a public and private key pair and sends an open request to the web server 32 for a trusted SSLX-EA Session Master Key (SMK) to be wrapped in the public key (A-BR1) 33. The request 33 has an Authentication Request value that determines which, and with what elements, of the following is performed. The web server 32 will make two replies after generating the SMK for this browser—one directly back to the browser with the $1^{st}$ half of the SMK wrapped using the browser's sent public key (A-WS2) 34; and the other to the DS 39 with the $2^{nd}$ half of the SMK wrapped using the web server's DS key (received during Verified Set Up) (A-WS3) 35. The browser 31 then sends an open request to the Directory Service (Server) (DS) 39 specified by the Web Server 32 for the other half of the SMK wrapped in the browser's DS key (if received during Verified Set Up), or a public key (if the browser has either not verified with this DS, or the browser has not verified with any DS and this is then the Server's DS by default) (A-BR4) 36. The DS 39 will relay the $2^{nd}$ half of the SMK back to the browser 31 using the browser's DS or public key (A-DS5) 37. The browser 31 will decrypt the SMK to then begin secure communications with the web server 32 using Normal Operation (Trusted) (A-BR6) 38.

A switch-based relay of the SMK through the DS 39 is made to both speed up the process (i.e., no encryption or decryption is done at the DS 39 during normal communications between the server and browser, but of course encryption/decryption is conducted during the exchange of the portions of the SMK) and to assure both the server owner and the browser owner that the DS 39 does not 'know' the relayed half of the actual SMK—it would be possible to store the exchange and perform a decrypt, but even if this were done, it is only one half of the key and is worthless. Any operating DS 39 should be required to demonstrate that it is not storing exchanges.

The manner in which the Security Level options are selected in the AH 30 is as follows: In the initial browser request, depending on the security setting, a list of DSs where the browser has performed a VSU is sent to the server, along with a public key for the reply. If the setting is High, the browser will send its list of VSU DSs; if the setting is Medium, it will send either the list (if it has one) or a blank list. If the setting is Low, then the browser will set a flag and tell the server to completely disregard using a DS and send back the authentication reply in total. When the server receives the list, it selects one that it has in its list of where it has undergone a VSU—or if the browser list is blank, the server defaults to using its DS; if the flag is set for security level Low then the server will reply in total directly to the browser.

For Medium or High settings, the server will default to its DS if its list of DSs does not match any of those in the browser DS list. As the server readies to reply to the browser, it first generates a DS ID for this AH. Then the server will reply to the browser (using the browser public key) and include the DS as the selection as well as this transmission's DS ID, along with the pertinent $1^{st}$ half of the Session Master Key (SMK). The server also replies to the DS using its DS key with the $2^{nd}$ half of the SMK; the server will always have a DS key to, at minimum, the CDS so the server-to-DS reply will always be SSLX-EA-encrypted.

When the browser receives the server reply, it unwraps the public key encrypted content. In a Low setting, the browser will process all of the content and the SMK is now shared and the browser and server are ready for Normal Operation. For Medium or High settings, the reply will include the server-selected DS. If this DS is not what the browser expected (was not in the list) and the browser security level is set to High, a warning should appear; if it was in the list, then the request and reply to the DS will use the browser's DS SSLX-EA key (for High and Medium). If the setting is for Medium and the DS is not in the list (because it wasn't in the sent list or there was no list), then the browser will use its public key for the DS request and reply communication.

A summary table of the Security Settings and resulting Options is shown in Table 1 below.

TABLE 1

| Security Setting | Browser | Server | Browser |
| --- | --- | --- | --- |
| High | AH initial request includes DS list | Select from list where match; if no match use Server DS | If not expected, warning! If expected, use DS SSLX-EA key |
| Medium | AH initial request includes DS list or flag set to Medium (blank list) | Select from list where match; if no match use Server DS or any VSU DS (log file notify of unknown DSs from list) | If match, use DS SSLX-EA key. If Server DS or unknown DS, use public key to DS |

TABLE 1-continued

| Security Setting | Browser | Server | Browser |
|---|---|---|---|
| Low | AH initial request includes flag set to Low | Reply directly to browser, no DS involved | Unwrap reply for SMK, no DS involved |

After an Authentication Handshake and the symmetric knowledge of the browser's SMK between the web server and the browser, Normal Operation handles all content requests and replies.

Verified Server (Optional Browser) Setup

The purpose of the Verified Setup is to establish a known relationship between two parties; in SSLX, this is between a server and a DS, or between a browser and a DS. At minimum, every server must undergo the Verified Setup (VSU) with at least one Directory Service/Server (DS). This establishes the minimum security of the SSLX system without end user participation to be Medium as described above. The optional browser participation in a VSU, to at least one DS, establishes the ability to communicate with High security.

In order to verify the initial authenticity of two parties in an electronic communication, it is obviously best to have some kind of human interaction. In SSLX, there are three means offered, one that entails minimal human interaction and a second automatic process. The entire impetus of a VSU is the act of verification. In either SSLX method, there is always the opportunity to further verify authenticity by 'double checking' in some other out-of-band method in addition to what is described here—such as phone, mail or additional personal interaction between the server owner and the DS operator.

The three SSLX methods:
1. A public key exchange between the server (or browser) and the DS of the SSLX-EA key (Low);
2. An email exchange of the SSLX-EA key (Medium); and
3. A combination of public key exchange and an email of two halves of the SSLX-EA key (High).

The operating code of an SSLX server and the browser will be set up to handle any of these methods, if not automatically, with human interaction (cut and paste, typed entry of the key, etc.). While some might argue that both email and a public key interaction are susceptible to Man-In-The-Middle (MITM) attacks, whether used separately or together, the most important aspect to remember about a Verified Set Up is that prior to any SSLX traffic of any kind, an additional out-of-band check can be made concerning the authenticity of the set up. It will be assumed that those web sites with an active interest in the security system and their customer's perceptions and expectations will generally use some kind of out-of-band spot checking of their set ups.

Operation

Figure 4:
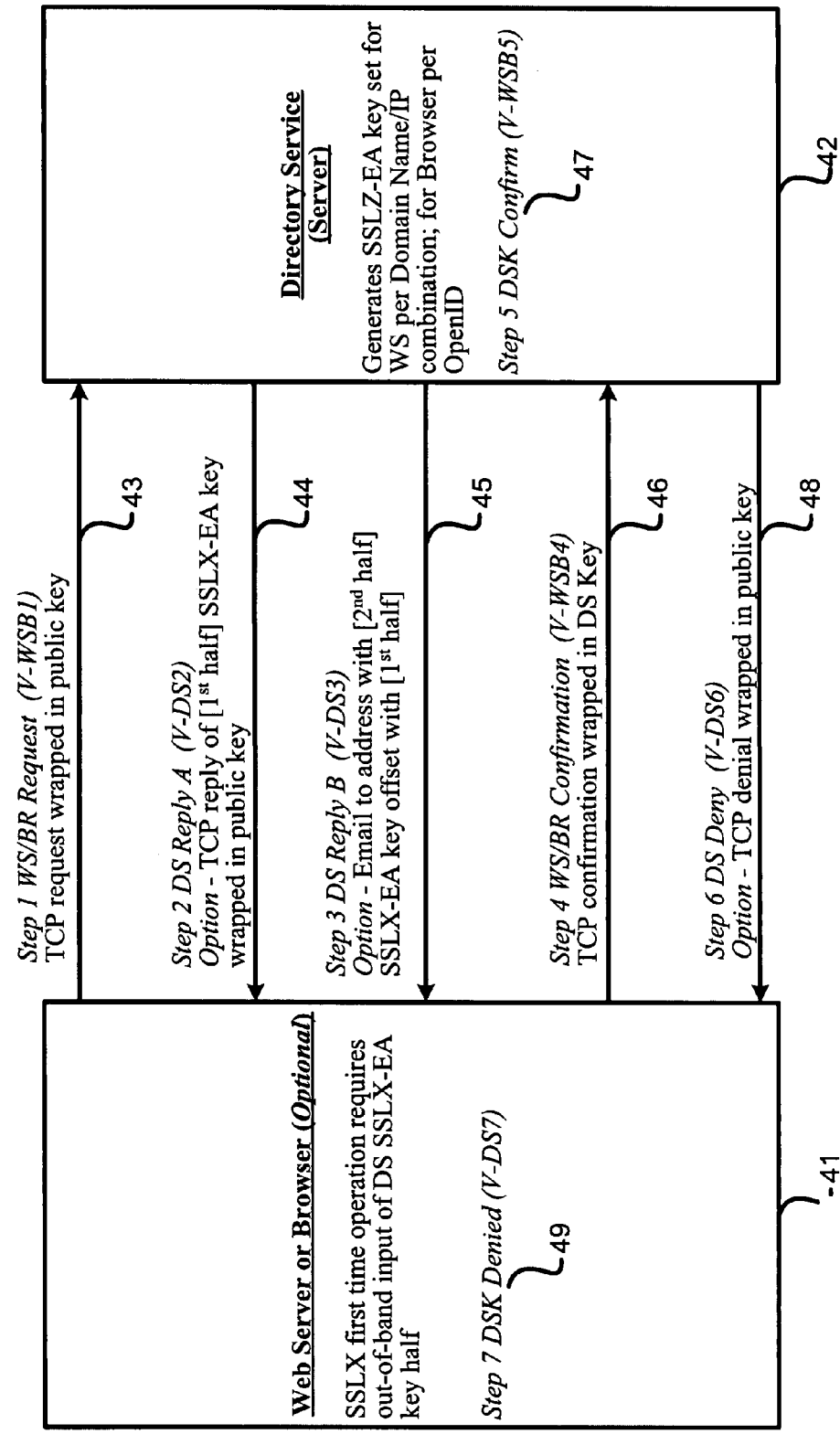
FIG. 4 is a diagram of a Verified Setup (VSU) according to still another aspect of the present invention.

Referring to FIG. 4, the following is the standard operation of the Verified Set Up 40 for both browser 41 and a server. The server (or browser) 41 first creates a public and private key pair, and sends an open request to the Directory Service 42 for a trusted SSLX-EA DS Key (DSK) to be wrapped in the public key (V-WSB1) 43. The request has an Authentication Request (AR) value that determines which, and with what elements, of the following is performed:

If the AR value is for the public key option, the DS will make only a single reply with the entire DSK wrapped using the sent public key (V-DS2) 44;
If the AR value is for the email option, the DS will make a single reply with the entire DSK sent in an email to the email address specified in the AR (V-DS2) 44;
If the AR value is for a combination of both public key and email, the DS will make two replies after generating the DSK for this server or browser—one directly back to the server/browser with the $1^{st}$ half of the DSK wrapped using the sent public key (V-DS2) 44; and the other in email to the email address specified in the AR with the $2^{nd}$ half of the DSK offset by the $1^{st}$ half (V-DS3) 45.

The server or browser 41 will allow input of up to the two halves of the DSK and store the DS DSK in the list of VSU DSs; and in order to finalize the verification set up, a confirmation TCP message will be sent to the DS 42 wrapped in the new DSK (V-WSB4) 46. The DS 42 will use the DSK to decrypt the confirmation message (V-WSB5) 47. If it is not confirmed, and the sent values do not equal the calculated values, then the DS 42 will send a "denied" message back to the browser or server 41 wrapped in the public key (V-DS6) 48. The browser or server 41 will then decrypt the denied message, send a notification to the user and remove the DS from the VSU list (V-DS7) 49.

After a Verified Set Up, both the server and the browser maintain a list of the DSs, along with the associated DSKs, and include these in Authentication Requests at SSLX-supported web sites.

While the previous embodiment shows transmitting a first half of the DSK via one path and a second half via another path, the invention is not limited to sending exactly half two ways, rather a first portion could be sent one path and a second portion could be sent another path, but the size of each portion could be different, as long as the total of both equals the entire DSK. Moreover, more than the necessary portion could be sent. Furthermore, more than two paths could be employed and in this case multiple portions of the DSK could be sent over multiple paths. Furthermore, any communication path could be employed, such as SMS, instant messaging, regular postal mail, express delivery, hand delivery, telephone call-in, etc.

Details of SSLX Interactions

The following are the design specifics of each SSLX operating mode and process.

Normal Operation (Trusted)

Browser SSLX-EA Session Master Key (SMK)—if obtained from Authentication Handshake.
  Associated with an OpenID, which is a unique identifier for this session at this server.
Browser SSLX-EA SMK—if obtained from data owner for secure access to specific domain.
  Obtained through out-of-band authenticated process to trusted server owner (e.g., such as an employee sending an email to an administrator with pertinent authentication information (employee number, etc.) and the administrator replying in email with the key and permanent OpenID).
  Server randomly creates a K1 value for each authenticated and accepted user.
  K1 value is stored, along with an assigned OpenID in the server's Key Distribution Center (KDC).

K1, OpenID and Domain are returned to the browser owner in the desired out of band method.
Inserted into browser.
  Menu option to add
    Add/Edit Form
      Cut and paste or type key and OpenID and Domain
      Option to PIN protect (0/1 entry on first digit of cookie or some method)
        Enter PIN, Reenter PIN
        MOD16 (PIN, key)
        Store in text file (cookie—format TBD)
Session Length
  Server setting to define session length
    0 (default)=one HTML page
    1=every request
    2=every request/reply round trip
    3=on first page (initial request to server)
    4=every 5 requests
    5=every 10 requests
    6=every n requests
GET/POST Browser Request for HTTPX://web address (browser, FIG. 2, Step 1, T-BR1)
  Get SSLX-EA SMK and OpenID
    Look up stored browser SMK
      If key exists, is it PIN protected (1 on first digit of cookie=Yes, 0=No)
        If Yes, Form to enter PIN
          Upon PIN entry, open key file, read key and MOD16D (PIN, key-encrypted), read result into memory
        If No, open key file and read key into memory
      If no key exists, perform an Authentication Handshake, use the resulting SMK
  Get Request text
  If start of SSLX-EA session,
    Perform an SSLX-EA
    Send SSLX-EA output in HTTPX to server
  Else if inside SSLX-EA session,
    Perform cipher encrypt using session SSLX-EA message key on request plaintext
    Send OpenID, ciphertext in HTTPX to server
HTTPX Reply (server, FIG. 2, Step 2, T-WS2)
  Get Browser's SMK based on request OpenID;
    If was created during an Authentication Handshake, then is stored in the local memory/immediate area
    If OpenID was not just created in an Authentication Handshake, this is either a file lookup for file-based KDC, or a Database lookup for DB KDC
  If start of SSLX-EA session,
    Perform SSLX-EA decrypt
    Process decrypted browser request, obtaining requested content
    Perform SSLX-EA encrypt where content is the plaintext
    Send SSLX-EA output in HTTPX back to browser
  Else if inside SSLX-EA session,
    Perform cipher decrypt using SSLX-EA message key
    Process decrypted browser request, obtaining requested content
    Perform cipher encrypt using SSLX-EA message key on content
    Send OpenID, ciphertext in HTTPX to browser
Browser Receipt of Content (browser, FIG. 2, Step 3, T-BR3)
  If this is a receipt of a newly started SSLX-EA session (session length=1),
    Perform SSLX-EA decrypt
  Else if inside an SSLX-EA session (session length <>1),
    Perform cipher decrypt using current SSLX-EA message key
  Process decrypted server content, obtaining HTML text/graphic/data
  Process HTML in browser and display to user
Key Update (browser and server versions, for permanent Trusted mode —Non-AH operation)
  As SSLX is intended to leverage HTTP's statelessness, each session would require a re-obtainment of the key from the KDC; but this operating condition might place unnecessary load (delay) on the server. As such, the server may be configured to hold an array of OpenID's and their associated SSLX-EA key in memory. There can also be a 'logout' or 'session end' message sent from the browser to the server upon either an application close or address bar request outside of the server's domain to release the key from server memory.
  As SSLX will be using the SSLX-EA method with a static key, it is pertinent to the security model to update K1 at some interval.
    Upon reaching the metric equal to the configuration setting in the server for K1 Update (e.g., a number of messages, a random time value, etc.), perform a key update exchange using the new K1 as the plaintext
    Hold the new K1 value until both server and browser confirm they have it, then update the key in the browser (using PIN if opted) and update the server KDC
Authentication Handshake (AH)
For an AH, the first pertinent item is the Browser Configuration. As mentioned, the browser can set the security level of their SSLX connections. Along with the security setting, there are two other configuration items the user may set:
  Option to use a preferred, particular DS to send entire handshake through
  Option to accept lowering the desired security level because the server cannot meet the setting (e.g., doesn't know the same Directory Service).
Table 2 lists all of the possible combinations of settings the user may select.

TABLE 2

| Security Level | DS AH Only Option (specify DS) | Accept Lower Security Level Option (On-Yes/Off-No) | Security Setting Flag Code | Server Response |
|---|---|---|---|---|
| High | X or no X | | 0 | If knows a DS - Ok<br>If not know a DS - FAIL |
| High | X or no X | X | 1 | If knows DS - Ok<br>If not know DS - Ok as 3 |

TABLE 2-continued

| Security Level | DS AH Only Option (specify DS) | Accept Lower Security Level Option (On-Yes/Off-No) | Security Setting Flag Code | Server Response |
|---|---|---|---|---|
| Medium | X | (X or no X) | 2 | If knows DS - OK<br>If not know DS - Ok as 3 |
| Medium (Default) | | (X or no X) | 3 | If List and knows a DS - Ok<br>If List and not know - Ok as CDS |
| Low | Not Available | Not Available | 4 | Ok |

When High is chosen, the browser user will be prompted to perform a DS VSU in order to retain the setting (if one is not already performed).

Browser Initiate to Web Server (browser, FIG. 3, Step 1, A-BR1)
  Create Public/Private key pair as per method
    Select shortest/fastest/most secure method of public/private key pair generation and generate key pair (Elliptic Curve Cryptography—ECC, most likely choice)
    For best security practice, generate as per AH—do not store/re-use
    Send Authentication Request (AR) in HTTPX://call to web server
    Send Security Setting Flag code, optional public key, optional VSU DS list (DS Name; DS IP Address, etc.) to web server (Security Setting Flag code is a setting in the Browser Config—Set initially on Browser Set Up to Medium (#3), the default)
    Security Setting Flag (SSF) codes where:
      0 (High)=key halves sent to BR and through Verified Set Up (VSU) DSs
      VSU list (possibly includes CDS, has at least one), OpenID, DS ID, public key included
      1 (High)=DS Only—entire key sent through VSU DS (public key included in case lowered to #3; a pre-registered DS Key exists at specific VSU)
      List with at least one DS, OpenID, DS ID, public key included
      2 (Medium)=DS Only—entire key sent through DS (optional VSU DS list or just a DS list, or no list)
      Optional VSU DS List, OpenID, public key included, DS ID
      3 (Medium)=(default), key halves sent to BR and through a DS;
      Public key included and optional VSU DS list, or just a DS list or no list), OpenID, DS ID
      4 (Low)=BR Only—entire key sent back to Browser (no DS)
      Public key included, OpenID
    OpenID is a 16-digit random hex number that identifies this browser (for this AH and instance of the browser)
    DS ID is a 32-digit random hex number that identifies the request ID that will be found and replied to in the DSDS IP is the public IP address of one of browser's Directory Services (VSU)
    Domain Name is a public HTTP designation—e.g., "www.sslnext.com"
Web Server reply to browser based on AR, SSF (server, FIG. 3, Step 2, A-WS2)
  If SSF=0
    Generate browser SMK (K1, 256-bits)
    Select matching VSU from browser list, get DS key (DSK)
      IF NO MATCH, reply (wrapped using public key) with SSLX Error # "No VSU Match—cannot process High Security without option to lower, Code 0"
      Browser error message says to look at configuration options, and change if want to connect to this server with current settings
      Generate log text file entry (if no file, create; if exists, append) of DS info (DS IP)
    Reply with $1^{st}$ half (32-digits, 128-bits) of SMK, DS IP, Domain Name wrapped in public key (Public key encryption method)
    Perform Step 3 to selected DS, using DS DSK and sending the browser's OpenID, the DS ID and $2^{nd}$ half of SMK
  If SSF=1
    Generate browser SMK
    Select VSU DS from browser, get DS key (DSK)
      IF NO MATCH, reply as if flag SSF setting was a "3", continue below (as lowering security level is acceptable)
      Generate log text file entry (if no file, create; if exists, append) of DS info (DS IP)
    Reply with DS IP, Domain Name wrapped in public key (so browser knows which DS was chosen)
    Perform Step 3 to specific DS, using DS DSK and sending the browser's OpenID, DS ID and whole SMK
  If SSF=2
    Generate browser SMK
    Select matching VSU DS from browser list (if list), or any DS (if list), or use CDS if no list—get DS key (DSK) (will at least be a CDS DSK)
      Should not be any error, as can use lowest common denominator of CDS
      Generate log text file entry (if no file, create; if exists, append) of DS info (DS IP) not in server's VSU list
    Reply with DS IP, Domain Name wrapped in public key
    Perform Step 3 to selected DS, using DS DSK and sending browser's OpenID, DS ID and whole SMK
  If SSF=3 (Default)
    Generate browser SMK
    Select matching VSU DS from browser list (if list), or any DS (if list), or use CDS if no list—get DS key (DSK) (will at least be a CDS DSK)
      Should not be any error, as can use lowest common denominator of CDS
      Generate log text file entry (if no file, create; if exists, append) of DS info (DS IP) not in server's VSU list Reply with 1st half (32-digits, 128-bits) of SMK, DS
IP, Domain Name wrapped in public key
Perform Step 3 to selected DS, using DS DSK and
sending the browser's OpenID, DS ID and $2^{nd}$ half
of SMK
If SSF=4
Generate browser SMK
Perform Step 5 sending whole SMK, Domain IP
Address, Domain Name back to browser wrapped
in public key
[Optional] Server Reply to Directory Service/Server
(server, FIG. 3, Step 3, A-WS3)
Since the server must have gone through Verified Set Up
to at minimum the CDS, then there is a DS Key (DSK)
This step is called with the DS ID and DS IP as parameters (from SSF return), minimally, the CDS
If SSF=0
Send OpenID, DS ID and $2^{nd}$ half of SMK
Perform SSLX-EA key exchange using DSK,
create new message key
Use message key in AES to encrypt the browser's OpenID, the DS ID, and the $2^{nd}$ half of SMK
Reply to DS's IP w/WS's OpenID at the DS, the
SSLX-EA output (R and W1), and the ciphertext
of SMK, DS ID
If SSF=1
Send OpenID, DS ID and whole SMK
Perform SSLX-EA key exchange using DSK,
create new message key
Use message key in AES to encrypt the browser's OpenID, the DS ID, and the whole SMK
Reply to DS's IP w/SSLX-EA output, the browser's OpenID and ciphertext of SMK, DS ID
If SSF=2
Send OpenID, DS ID and whole SMK
Perform SSLX-EA key exchange using DSK,
create new message key
Use message key in AES to encrypt the browser's OpenID, the DS ID, and the whole SMK
Reply to DS's IP w/SSLX-EA output, the browser's OpenID and ciphertext of SMK, DS ID
If SSF=3
Send OpenID, DS ID and $2^{nd}$ half of SMK
Perform SSLX-EA key exchange using DSK,
create new message key
Use message key in AES to encrypt the browser's OpenID, the DS ID, and the $2^{nd}$ half of SMK
Reply to DS's IP w/SSLX-EA output, the browser's OpenID and ciphertext of SMK, DS ID
If SSF=4, skip this Step
[Optional] Browser Request to Directory Service/Server
(browser, FIG. 3, Step 4, A-BR4)
Either the browser has gone through Verified Set Up and
has a DS DSK, or the DS will be given the browser's
public key for the reply
This step is called with the DS ID and DS IP as parameters (from SSF return), or minimally, the CDS
If SSF=0
Send a DS Request (DSR) using DSK to the specified DS IP encrypting the OpenID, DS ID and
asking for $2^{nd}$ half of SMK, Domain Name, IP
Address
If SSF=1
Send a DSR to the specified DS IP using DSK
where the OpenID and DS ID are encrypted, and
asking for whole SMK, Domain Name, IP
Address
If SSF=2
Send a DSR to the specified DS IP using DSK (if
there was a list and there is a DSK), encrypting
OpenID, DS ID and asking for whole SMK,
Domain Name, IP Address
If no DSK, send a DSR to the specified DS IP
where the OpenID, DS ID and public key are
openly sent, and the whole SMK, Domain Name
and IP Address are requested
If SSF=3
Send a DSR to the specified DS IP using DSK (if
there was a list and there is a DSK), encrypting
OpenID, DS ID and asking for $2^{nd}$ half of SMK,
Domain Name, IP Address
If no DSK, send a DSR to the specified DS IP
where the OpenID, DS ID and public key are
openly sent, and the $2^{nd}$ half of SMK, Domain
Name and IP Address are requested
If SSF=4, then skip this Step
[Optional] Directory Service/Server reply to browser (DS,
FIG. 3, Step 5, A-DS5)
If SSF=4, this step is not performed
The browser has submitted a DS Request (DSR) using
either a DSK or a public key for the reply
If DSR sent using a DSK, then there will be an
OpenID
Use OpenID to get correct DSK for this browser
If DS ID provided, use it to get correct SMK for this
browser session; if not provided, then use
OpenID to get correct SMK
Perform an SSLX-EA Key exchange using the
DSK and reveal the message key—check W1
sent w/W1 generated—if match continue (else
error)
Use message key in AES decrypt to reveal request
(authenticates browser)
If SSF=0
AES Message Key already known from Browser
request
Use message key encrypt $2^{nd}$ half of SMK,
Domain Name and IP Adress
Reply to browser's IP with SSLX-EA output,
ciphertext
If SSF=1
AES Message Key already known from Browser
request
Use message key encrypt whole SMK, Domain
Name and IP Address
Reply to browser's IP with SSLX-EA output,
ciphertext
If SSF=2
AES Message Key already known from Browser
request
Use message key encrypt whole SMK, Domain
Name and IP Address
Reply to browser's IP with SSLX-EA output,
ciphertext
If SSF=3
AES Message Key already known from Browser
request
Use message key encrypt $2^{nd}$ half of SMK,
Domain Name and IP Address
Reply to browser's IP with SSLX-EA output,
ciphertext If DSR sent using browser's public key, then there will be a DS ID (and OpenID)
    Use DS ID to get correct SMK for this browser session
        If SSF=2
        Public Key already known from Browser request
        Use public key to encrypt whole SMK, Domain Name and IP Address
        Reply to browser's IP with ciphertext output
        If SSF=3
        Public Key already known from Browser request
        Use public key to encrypt $2^{nd}$ half of SMK, Domain Name and IP Address
        Reply to browser's IP with ciphertext output
Browser decrypt of content (browser, FIG. 3, Step 6, A-BR5)
    If SSF=0
        AES Message Key is stored, so use it to reveal $2^{nd}$ half of SMK, Domain Name and IP Address
        Check Domain Name/IP address from server against domain name from DS—if same continue, else stop and warn user!
        Concatenate $1^{st}$ half and $2^{nd}$ half of SMK making it whole
        Use SMK in Normal Operations
    If SSF=1
        AES Message Key is stored, so use it to reveal SMK, Domain Name and IP Address
        Check Domain Name/IP address from server against domain name from DS—if same continue, else stop and warn user!
        Use SMK in Normal Operations
    If SSF=2
        If DSR sent using a DSK, then
            AES Message Key is stored, so use it to reveal SMK, Domain Name and IP Address
        Else if DSR sent using public key
            Perform decrypt using public key to reveal whole SMK, Domain Name and IP Address
        Check Domain Name from server against domain name from DS—if same continue, else stop and warn user!
        Use SMK in Normal Operations
    If SSF=3
        If DSR sent using a DSK, then
            AES Message Key is stored, so use it to reveal SMK, Domain Name and IP Address
        Else if DSR sent using public key
            Perform decrypt using public key to reveal whole SMK, Domain Name and IP Address
        Check Domain Name/IP address from server against domain name from DS—if same continue, else stop and warn user!
        Concatenate $1^{st}$ half and $2^{nd}$ half of SMK making it whole
        Use SMK in Normal Operations
    If SSF=4
        Server reply sent using public key
            Perform decrypt using public key to reveal whole SMK, Domain Name
            Check Domain Name from server against domain in address bar—if same continue, else stop and warn user!
        Use SMK in Normal Operations
Verified Server (Optional Browser) Set Up (VSU)
For browser, initiate VSU on menu option to Directory Service/Server (browser, FIG. 4, Step 1, V-WSB1)
For server, initiate VSU on applet/extension execution (server, FIG. 4, Step 1, V-WSB1)
Remaining flow (all Steps) is for both browser and server; details where noted
    Create Public/Private key pair as per method
        Select shortest/fastest/most secure method of public/private key pair generation and generate key pair (Elliptic Curve Cryptography—ECC, most likely choice)
        For best security practice, generate as per VSU—do not store/re-use
    Send VSU Request (VSUR) in TCP call to DS
        Send DS Flag code, Domain Name (server only), optional public key, optional email address to DS
        Browser: DS Flag code is a setting in the Browser Config—Set initially on Browser Set Up to High (#0), the default. No Domain Name required for browser
        Server: Only method of operation is High; minimally, VSU occurs on initial startup of server to connect with CDS. Domain Name is a requirement.
        DS Flag (DSF) codes where:
            0 (High)=key halves sent through email and through DS
            Public key, email address, Domain Name included
            1 (Medium)=Email Only—entire key sent through email
            Email address, Domain Name included
            2 (Low)=DS Only—entire key sent through DS (no email)
            Public Key, Domain Name included
            Email address is a public POP address
Directory Service/Server reply to browser or server (DS, FIG. 4, Step 2, V-DS2)
    If DSF=1, this step is not performed
    The browser or server has submitted a VSUR using a public key for the reply
        Generate OpenID, DSK for entity (browser or server)
            If DSF=0
                Reply with $1^{st}$ half (32-digits, 128-bits) of DSK, OpenID, wrapped in public key
                Perform Step 3 to email address, using public key and sending the $2^{nd}$ half of DSK offset (MOD16 encrypted) by $1^{st}$ half
            If DSF=2
                Reply with whole DSK, OpenID wrapped in public key
Directory Service/Server reply to browser or server (DS, FIG. 4, Step 3, V-DS3)
    If DSF=2, this step is not performed
    The browser or server has submitted a VSUR using an email address for the reply
        Generate OpenID, DSK for entity (browser or server) (IF not already done in Step 2)
            If DSF=0
                Reply with $2^{nd}$ half (32-digits, 128-bits) of DSK Mod16 encrypted with $1^{st}$ half, OpenID to email address
            If DSF=1
                Reply with whole DSK, OpenID in message to email address
Browser/server decrypt of reply and confirmation (browser/server, FIG. 4, Step 4, V-WSB4)
    If DSF=0
        Perform decrypt using public key to reveal $1^{st}$ half of DSK Open email message to reveal 2$^{nd}$ half of DSK
Open Applet for key entry
  Enter both halves, and OpenID, into applet fields
    (form for entry of OpenID, DSK 1$^{st}$ half, DSK
    2$^{nd}$ half, full DSK—when show form, only those
    applicable to the DSF method (either 1$^{st}$ and 2$^{nd}$
    half active, or full DSK active)
  Click button for "Plug In Key" (or some relevant,
    pertinent UI text)
    Applet will take 2$^{nd}$ half and perform a
    MOD16D using 1$^{st}$ half to reveal correct 2$^{nd}$ half
    Concatenate 1$^{st}$ half and 2$^{nd}$ half of DSK making
    it whole
    Insert into use (store DSK, OpenID in cookie,
    file, db—method? These are the VSU DSs for the
    list submission in an AH)
If DSF=1
  Open email message in specified email mailbox
  Open Applet for key entry
    Enter full DSK and OpenID, into applet fields (cut
    and paste available)
    Click button for "Plug In Key" (or some UI text)
    Applet will insert into use (store DSK, OpenID in
    cookie, file, db—method? These are the VSU
    DSs for the list submission in an AH)
If DSF=2
  Perform decrypt using public key to reveal whole
    DSK
  Open Applet for key entry
    Enter both halves, and OpenID, into applet fields
    (form for entry of OpenID, DSK 1$^{st}$ half, DSK
    2$^{nd}$ half, full DSK—when show form, only those
    applicable to the DSF method (either 1$^{st}$ and 2$^{nd}$
    half active, or full DSK active)
    Click button for "Plug In Key" (or some relevant,
    pertinent UI text)
    Applet will take 2$^{nd}$ half and perform a
    MOD16D using 1$^{st}$ half to reveal correct 2$^{nd}$ half
    Concatenate 1$^{st}$ half and 2$^{nd}$ half of DSK making
    it whole
    Insert into use (store DSK, OpenID in cookie,
    file, db—method? These are the VSU DSs for the
    list submission in an AH)
  Reply to DS in TCP with Confirmation message
    Perform SSLX-EA key exchange using DSK, getting
    message key
    Use message key in AES to encrypt confirmation
    message
    Message format: "[OpenID] DS VSU ready!"
    Send SSLX-EA output (OpenID, R) and ciphertext to
    DS
DS decrypt of confirmation message (DS, FIG. 4, Step 5,
  V-WSB5)
  For all DSF values (0,1,2)
    Perform an SSLX-EA Key exchange using the DSK
    (found by sent OpenID) and reveal the message key
    Use message key in AES to decrypt confirmation
    If OpenID in message matches OpenID in header,
    confirmation
    If not, send Deny message; Browser/Server only
    receives if denied
    If Yes, store Domain Name, IP Address, OpenID,
    DSK, email address
[Optional] DS deny message (DS, FIG. 4, Step 6, V-DS6)
  If the browser or server receives a DS Deny message,
  then the DSK is not correct, and the VSU process has
  failed
    DS Deny message is sent wrapped in the public key
    Message format: "[OpenID] DS VSU failed!"
    Decrypt public key DS Deny message to reveal message
[Optional] Web server/browser deletes stored DSK and
  OpenID information (browser/server, FIG. 4, Step 7,
  V-DS7)
    Delete stored DSK, OpenID (in cookie, file, db entry—
    method?)
    Notify user of failed VSU
SSLX-Embedded Authentication Description SSLX uses the preceding communications architecture and processes to create an authentic and secure channel between the participants. As the entire basis for the SSLX communications routing is the speed and timing of each secure communications, it is imperative that the method of authenticating and encrypting be able to be performed in real-time for any public network user. An acceptable electronic encryption comprises the Advanced Encryption Standard (AES), which can encrypt in real-time. Currently, no authentication mechanism exists that can operate at the real-time speeds necessary. In order to bring SSLX to realization, a new embedded authentication technique is employed as follows.

The SSLX-Embedded Authentication (SSLX-EA) algorithm is comprised of two parts, one for authentication and one for encryption. Authentication is performed using two new fast and simple low-level functions (combining and extraction) and is performed implicitly (embedded); if the recipient decrypts the cipher text into valid plaintext (an http traffic communication such as a web page or file transfer), then the recipient can safely assume the message came from the correct sender. An exemplary encryption function comprises AES-nBit in a stream mode using a child key created by the extraction low-level function as the message key, where nbit is the defined length of the starting shared Key, $K_1$.

The following process describes the SSLX-EA:

0. One time setup: Establish a shared n-bit key, $K_1$. [SSLX does this by various means as described above, including public key methods and out of band delivery. The secret is a key established between the participants (browser and server) and the trusted third party (DS); this key is termed a Directory Service Key (DSK)].

1. Generate an n-bit random hexadecimal number (32 4-bit numbers for 128-bit), R.
  R should come from an industry standard random number generator/generation technique/process.

2. Combine Rand $K_1$, resulting in an n-bit 'alphabet', A.

3. Extract n-bit message key W out of A using $K_1$.

4. Encrypt the plaintext message m: the sender computes the ciphertext $C=E(w_i, m)$ where E is AES-nBit in a stream mode, and sends the following message to the recipient:
  OpenIDSender, R, C, [optionally T]
where OpenIDSender is the publicly-known identification of the sender and T is an optional n-bit token at the start of the ciphertext for purposes of a quick decrypt authentication check prior to decrypting the entire message (either a static pre-assigned token, a full or partial extract of W out of A, or some other shared value).

SSLX-EA provides simple and fast authentication and encryption between SSLX participants. It combines randomness (Steps 0 and 1), substantial and sufficient loss of information in the combination and extraction functions (Steps 2 and 3), and the best practice industry standard encryption (Step 4).

There are many different available algorithms that may be substituted into the SSLX-EA; but none that are faster, sufficient for the purpose or as simple and computationally inexpensive.

SSLX-EA Low-level Cryptographic Functions

The combining function (Step 2) details:

2. The combining function details: Combine R and $K_1$, resulting in a n-bit 'alphabet', A.
   2.1 Select an R digit by using the $1^{st}$ digit of $K_1$ as a pointer into R beginning at the $1^{st}$ digit position and moving $K_1$'s value in digit positions to the right in R where the starting position in R is the $0^{th}$ value position.
   2.2 Select a $K_1$ digit by using the $1^{st}$ digit of R as a pointer into $K_1$ beginning at the $1^{st}$ digit position and moving R's value in digit positions to the right in $K_1$ where the starting position in $K_1$ is the $0^{th}$ value position.
   2.3 Hexadecimal add without carry the selected R digit from Step 2.1 and the $K_1$ digit from Step 2.2. This sum is the first digit of the result number, A.
   2.4 Repeat 2.1, 2.2 and 2.3 using the next digit to the right in R and $K_1$ where the starting digits for the steps is one position to the right of the previously selected digit (the $0^{th}$ value position). Continue until the result A is the same length as R and $K_1$ (n-bits, 32 4-bit hex numbers for 128-bits).

EXAMPLE:

$R_1$=0123456789 $K_1$=9876543210
2.1: 9, using 9 from $K_1$ and selecting 9 in R
2.2: 9, using 0 from Rand selecting 9 in $K_1$
2.3: A first digit is 2 from (9+9) Mod 16=2
2.1: Repeat, taking 8, using 8 from $K_1$ and selecting 8 in R having started at the $1^{st}$ position, which is the first digit position to the right of the previously selected last digit (9)
2.2: 7, using 1 from R and selecting 7 in $K_1$ having started at the $2^{nd}$ position, which is the first digit position to the right of the previously select first digit (9)

2.3: A second digit is F from (8+7) Mod 16=F continue until reaching the end of $K_1$
A=2FA3EDA589 from
   (9+9)Mod 16=2
   (8+7)Mod 16=F
   (6+4)Mod 16=A
   (3+0)Mod 16=3
   (9+5)Mod 16=E
   (4+9)Mod 16=D
   (8+2)Mod 16=A
   (1+4)Mod 16=5
   (3+5)Mod 16=8
   (4+5)Mod 16=9

The extraction function (Step 3) details:

3. The extraction function details: Extract n-bit key W out of A using $K_1$
   3.1 Select an A digit by using the $1^{st}$ digit of $K_1$ as a pointer into A beginning at the $1^{st}$ digit position and moving $K_1$'s value in digit positions to the right in A where the starting position in A is the $0^{th}$ value position.
   3.2 Use the selected A digit as the first digit of the result number, W.
   3.3 Repeat 3.1 and 3.2 using the next digit to the right in $K_1$ and the starting digits in A as one position to the right of the previously selected digit (and this is the $0^{th}$ value position). Continue until the result W is the same length as $K_1$ and A (n-bits, 32 4-bit hex numbers for 128-bit).

Example:

Using A=2FA3EDA589 and $K_1$=9876543210, resulting in W=98A39E8F3E

NOTE: A known weak key ($K_1$) of all zeros (0) should be avoided as A and W will be identical to R.

Reference Implementation:

The following is Visual Basic code for the two SSLX-EA functions and a complete single call function for executing SSLX-EA in either encrypt or decrypt mode:

```
' FUNCTION: SSLX-EA Combine Function
' NAME:    SSLXEACombine
' PURPOSE: Function to permute the K1 key with the random salt (R):
'          Step 2 in the SSLX-EA: Combine R and K1, resulting in a n-bit 'alphabet', A
' TYPE:    General function - SSLX-EA Combine call
' CALL:    SSLXEACombine(sR, sK1)
'          where sK1 is the starting key value, sR is the random salt
' RTRN:    A string value of: sA
' ERROR:   Null return
'
' Example:
    SSLXEACombine("45384189FE42A1C1A00F795AA9A0819ED39BBEBF19FBF40F6
AEB4C6B362A56DC",
0123456789ABCDEF0123456789ABCDEF0123456789ABCDEF0123456789ABCDEF")
returns
         "A:
8DF5857C06A9D6DDE421EB4F362E766A1BEA6733FC41F8F0728634720FFF52D7"
' Test Vector: The example is a test vector
'
    Public Function SSLXEACombine(sRand As String, sKey1 As String) As Variant
    Dim sA As String
    Dim sRTemp As String
    Dim sK1Temp As String
    Dim sRi As String
    Dim sK1i As String
    Dim nCount As Integer
    Dim nCount1 As Integer
    Dim i As Integer\
    Dim nStart As Integer
    If sRand = "" Or sKey1 = "" Then
        SSLXEACombine = ""
        Exit Function
```

```
    Else
        'Combine R and K1, resulting in a n-bit 'alphabet', A
        'sA = SSLXEACombine(sR, sK1)
        nCount = Len(sRand)
        nCount1 = Len(sKey1)
        If nCount <> nCount1 Then
            SSLXEACombine = ""
            Exit Function
        End If
        sRTemp = sRand
        sK1Temp = sKey1
        nStart = 0
        For i = 1 To nCount
            nVal = nStart + Val("&H" & Mid(sKey1, i, 1)) + 1
            If nVal > nCount Then
                nVal = nVal − nCount
                nStart = 0
            End If
            sRi = sRi & Mid(sRand, nVal, 1)
            nStart = nVal
        Next
            nStart = 0
        For i = 1 To nCount
            nVal = nStart + Val("&H" & Mid(sRand, i, 1)) + 1
            If nVal > nCount Then
                nVal = nVal − nCount
                nStart = 0
            End If
            sK1i = sK1i & Mid(sKey1, nVal, 1)
            nStart = nVal
        Next
        'Last, mod add the two intermediate strings
        SSLXEACombine = MOD16(sRi, sK1i)
    End If
End Function
```

```
' FUNCTION: SSLX-EA Extract Function
' NAME:   SSLXEAExtract
' PURPOSE: Function to extract the W key from the A alphabet:
'       Step 3 in the SSLX-EA: Extract n-bit key W out of A using K1
' TYPE:   General function - SSLX-EA Extract call
' CALL:   SSLXEAExtract(sA, sK1)
'       where sK1 is the starting key value, sA is the combined alphabet
' RTRN:   A string value of: sW
' ERROR:  Null return
' Example:
   SSLXEAExtract("8DF5857C06A9D6DDE421EB4F362E766A1BEA6733FC41F8F0728
634720FFF52D7",
"0123456789ABCDEF0123456789ABCDEF0123456789ABCDEF0123456789ABCDEF")
returns
        "W:
8F56DEEAF7D62F2C0A6447A13D6BE77DE2B66616574640CF326B3F6F8D6788DA"
' Test Vector: The example is a test vector
'
Public Function SSLXEAExtract(sAlphabet As String, sKey1 As String) As Variant
Dim sATemp As String
Dim sW As String
Dim nCount As Integer
Dim nCount1 As Integer
Dim i As Integer
If sAlphabet = "" Or sKey1 = "" Then
    SSLXEAExtract = ""
    Exit Function
Else
    'Extract n-bit key W out of A using K1
    'sW = SSLXEAExtract(sA, sK1)
    nCount = Len(sAlphabet)
    nCount1 = Len(sKey1)
    If nCount <> nCount1 Then
        SSLXEAExtract = ""
        Exit Function
    End If
    sATemp = sAlphabet
    nStart = 0
      For i = 1 To nCount
```

```
                nVal = nStart + Val("&H" & Mid(sKey1, i, 1)) + 1
                If nVal > nCount Then
                    nVal = nVal – nCount
                    nStart = 0
                End If
                sW = sW & Mid(sAlphabet, nVal, 1)
                nStart = nVal
        Next
            'Return value
        SSLXEAExtract = sW
    End If
End Function
```

```
' FUNCTION: Authentication and Message Key Generation Function - Encrypt/Decrypt
' NAME: SSLXEABundle
' PURPOSE: A full bundled function to perform the SSLX-EA Authentication and Message
'          Key generation:
'1. Generate a n-bit random hexadecimal number (32 4-bit numbers for 128-bit), R (Encrypt, Decrypt send in R)
'2. Combine R and K1, resulting in a n-bit 'alphabet', A
'3. Extract n-bit key W out of A using K1
'4. Encrypt the plaintext message m using AES-nBit in a stream mode, and sends the following
'          to the recipient:
'   OpenIDSender, R, C
'   where OpenIDSender is the publicly-known identification of the sender
' TYPE:   General function - SSLX-EA bundled call
' CALL:   SSLXEAEnc(sK1, sR)
'         where sK1 is the starting key value, sR is the rand # (for decrypt)
' RTRN:   A string value of: sR, sT, sA, sW
' ERROR:  Null return
'Example:
SSLXEAEnc("0123456789ABCDEF0123456789ABCDEF0123456789ABCDEF0123456789ABCDEF",
45384189FE42A1C1A00F795AA9A0819ED39BBEBF19FBF40F6AEB4C6B362A56DC")
returns
        "R: 45384189FE42A1C1A00F795AA9A0819ED39BBEBF19FBF40F6AEB4C6B362A56DC
        T: 03676F47F3F6D7AF80786476E72522E77FDB7A7F8F779D6C8725CF6F25DE6337
        A: 8DF5857C06A9D6DDE421EB4F362E766A1BEA6733FC41F8F0728634720FFF52D7
        W: 8F56DEEAF7D62F2C0A6447A13D6BE77DE2B66616574640CF326B3F6F8D6788DA"
' Test Vector: The example is a test vector
'
Public Function SSLXEABundle(sK1 As String, Optional sR As String) As Variant
Dim sA As String
Dim sW As String
Dim sT As String
If sK1 = "" Then
    SSLXEABundle = ""
    Exit Function
Else
    'Get a Rnd R (Encrypt), decrypt sends R
    'For n-bit AES...
    If sR = "" Then
        sR = GetRandom((Len(sK1) / 2), "")
    Else
        If Len(sR) <> Len(sK1) Then
            SSLXEABundle = ""
            Exit Function
        End If
    End If
    'Combine R and K1, resulting in a n-bit 'alphabet', A
    sA = SSLXEACombine(sR, sK1)
    If sA = "" Then
        SSLXEABundle = ""
        Exit Function
    End If
    'Extract n-bit key W out of A using K1
    sW = SSLXEA Extract(sA, sK1)
    If sW = "" Then
```

```
            SSLXEABundle = ""
            Exit Function
        End If
        'Encrypt the plaintext message m using AES-nBit in a stream mode
        'Perform this step in the calling area...
        'Note: IF want a token check instead of doing whole decrypt,
        ' uncomment this and use as ENCRYPTED token check; e.g., either
        ' send inside same plaintext or do 2 encrypts/decrypts
        'sT = SSLXEAExtract(sA, sW)
            SSLXEABundle = "R: " & sR & Chr$(13) & Chr$(10) & _
                "T: " & sT & Chr$(13) & Chr$(10) & _
                "A: " & sA & Chr$(13) & Chr$(10) & _
                "W: " & sW & Chr$(13) & Chr$(10)
    End If
    End Function
```

Comparison to Secure Sockets Layer/Transport Layer Security (SSL/TLS)

SSLX meets the same goals as SSL/TLS: authentication and data security, including some of the same example architectures such as the Internet. One of the benefits of using SSLX is that SSLX accomplishes the same goals, but does so in fewer steps—and has less data and calculation demand in those simpler steps. The following shows the distinct differences between SSL/TLS and SSLX.

Figure 5:
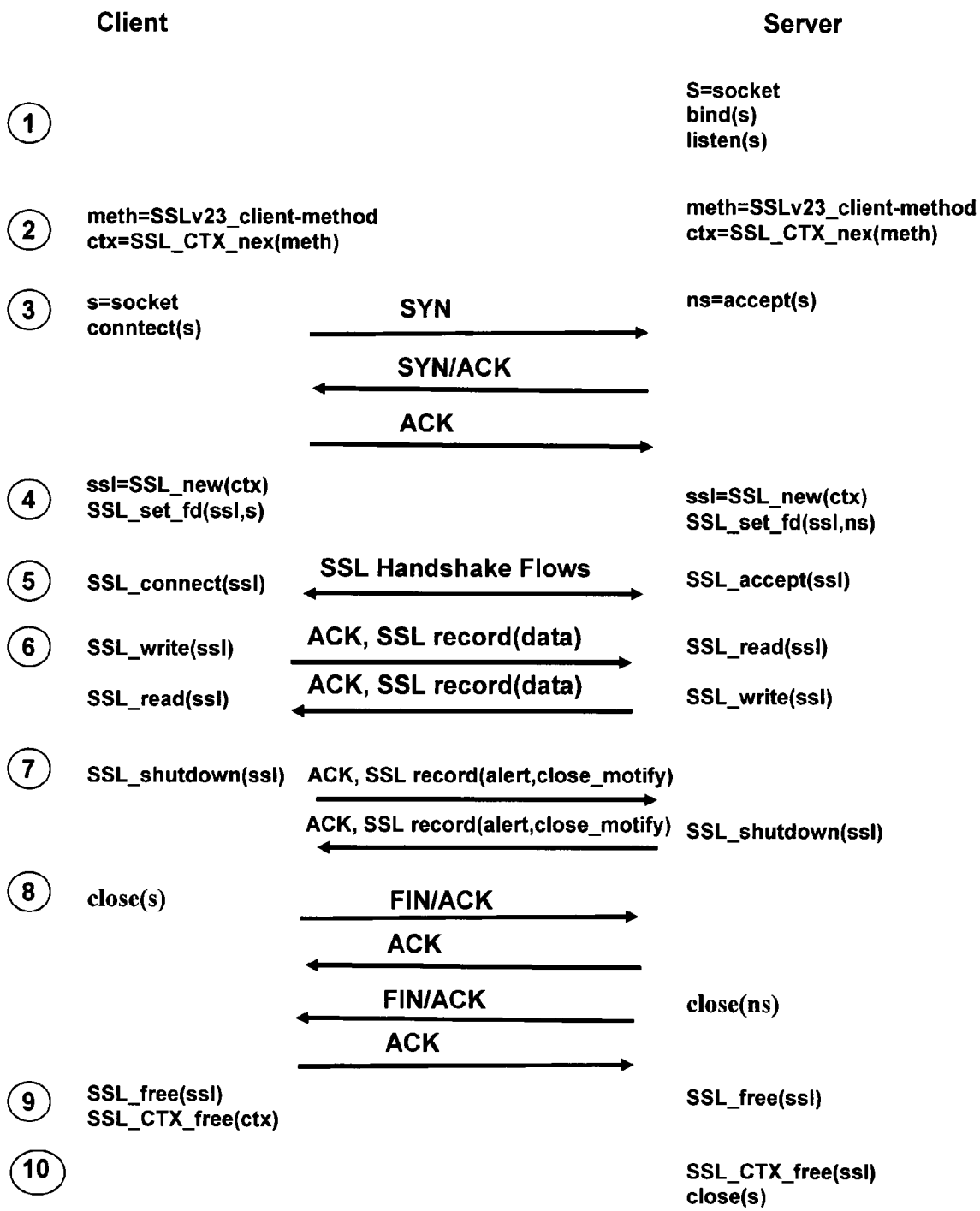
FIG. 5 is an SSL Session Flow.
Figure 6:
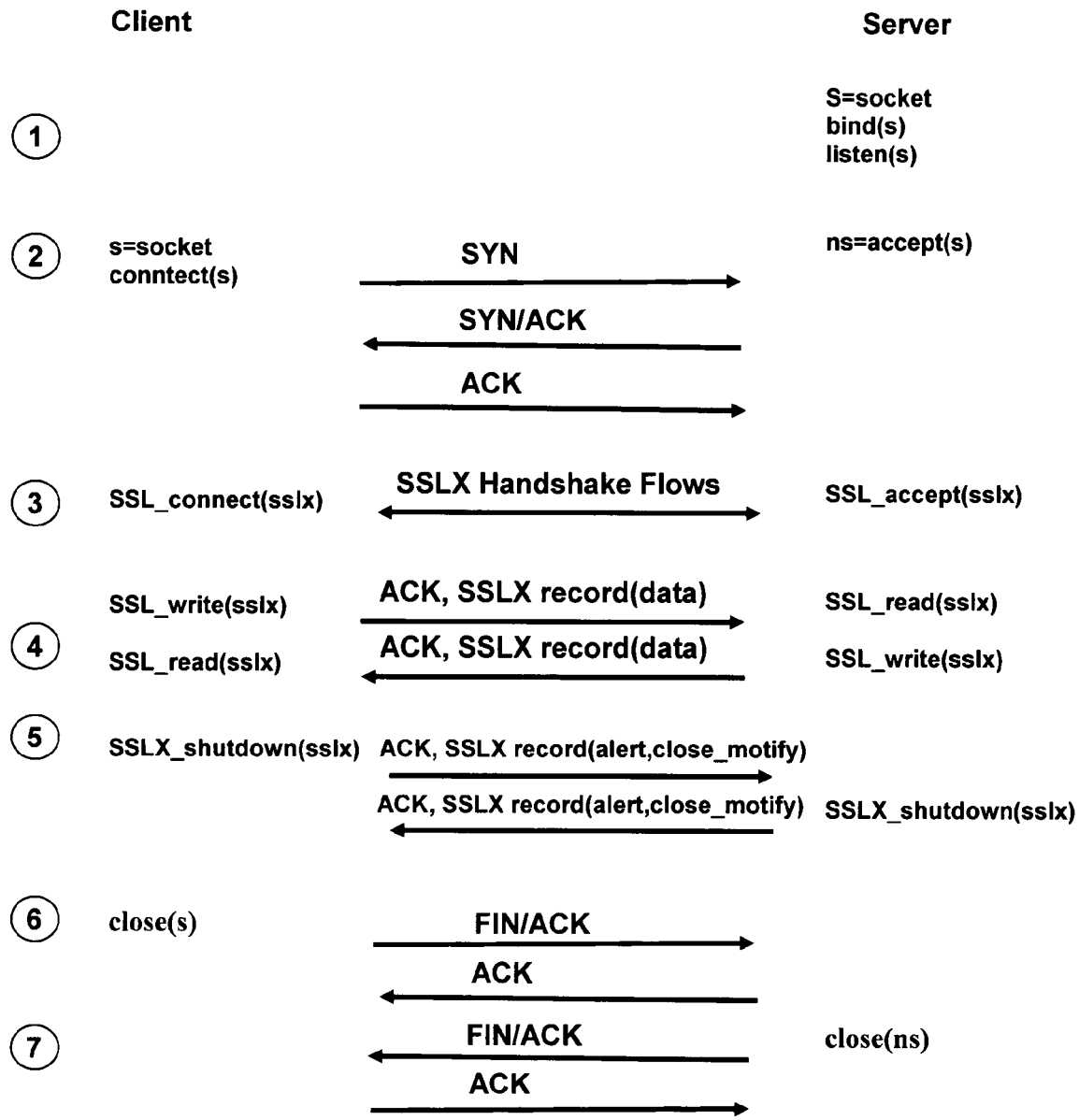
FIG. 6 is the SSLX Session Flow according to yet another aspect of the present invention.

The SSLX Session Flow follows a general TCP session flow, and SSLX uses different call syntax; e.g., see FIGS. 5 and 6. In SSLX there is no certificate and AES is the cipher module. Step 2, 9 and 10 of the SSL flow, therefore, are not necessary.

Steps 5 and 6 are the 'normal operation' of SSL, which are replaced by Steps 3 and 4 in SSLX—using a handshake to define a session key (message key), and then encrypting the contents to send back and forth between the browser and the server. The main distinction is that in SSL authentication only occurs once—in the handshake. In an SSLX session, step 4 includes an authenticated SSLX-EA key exchange once every session, which can be defined as short as every transmission.

Figure 7:
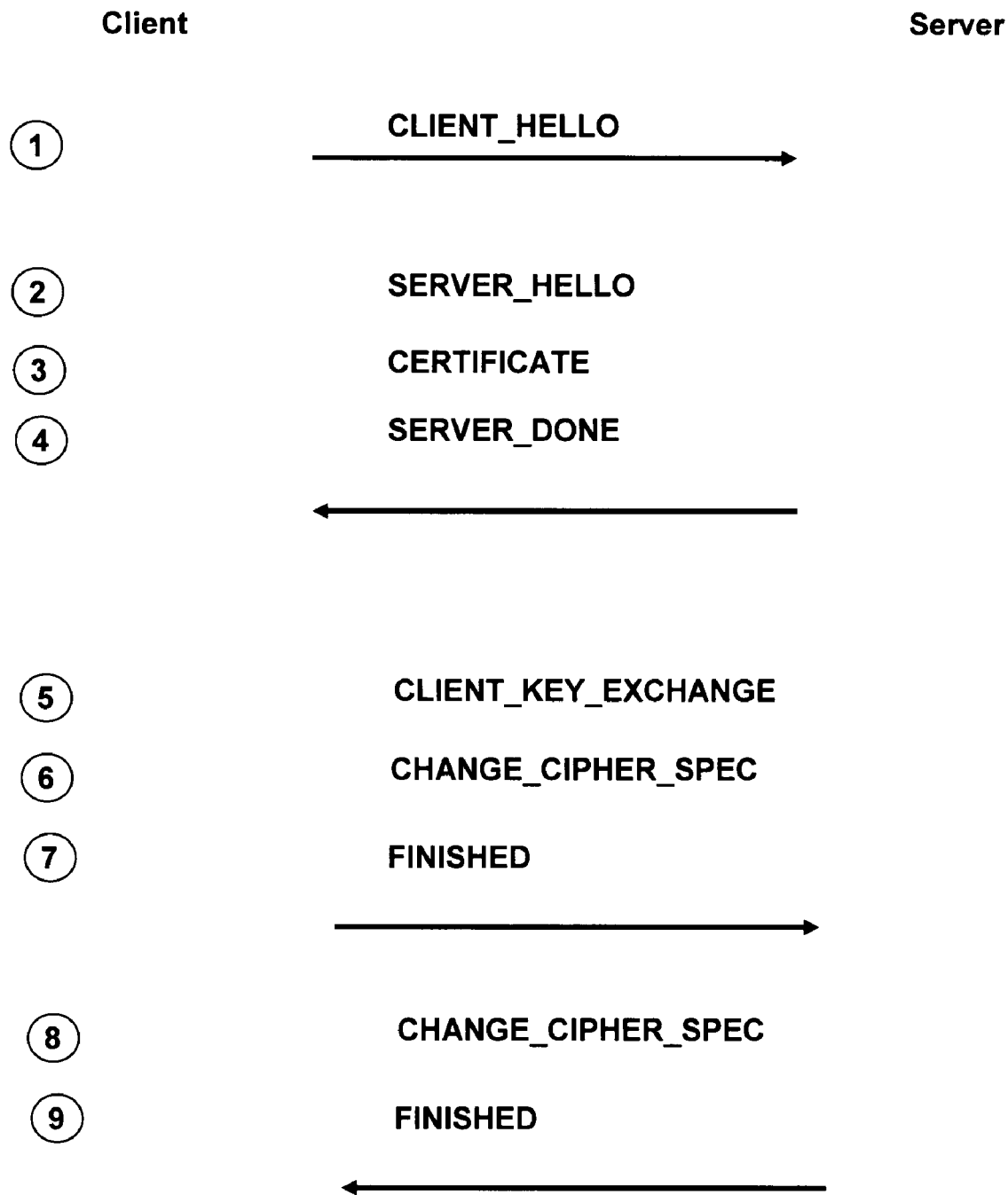
FIG. 7 is an SSL Handshake Flow for a New Session.
Figure 8:
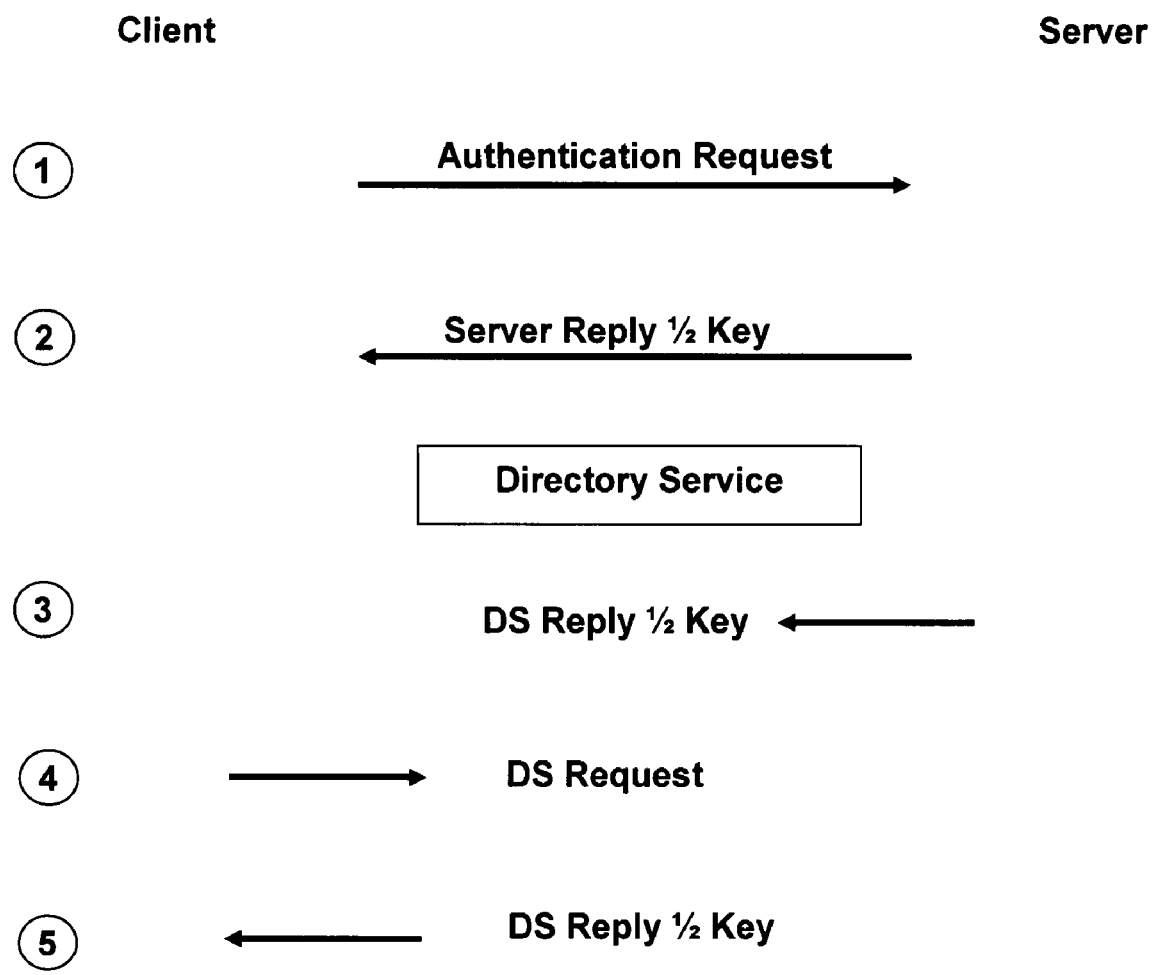
FIG. 8 is the SSLX Handshake Flow for a New Session according to still another aspect of the present invention.

In comparing the SSL and SSLX Handshakes FIGS. 7 and 8, the SSLX version has fewer steps and less computational requirement. In SSL, there is a version of the handshake that includes a browser certificate, and that makes the already complicated handshake even more so.

Step 3 in the SSL handshake is very computationally expensive: a digest of the signed messages in the Hello sequence is calculated to compare with the browser submitted digest. The amount of information passed in these digests and certificates is also considerable (upwards of 3 KB). In comparison, the SSLX calculations are less than 10% of the computational effort and bandwidth requirement (256-bits).

Figure 9:
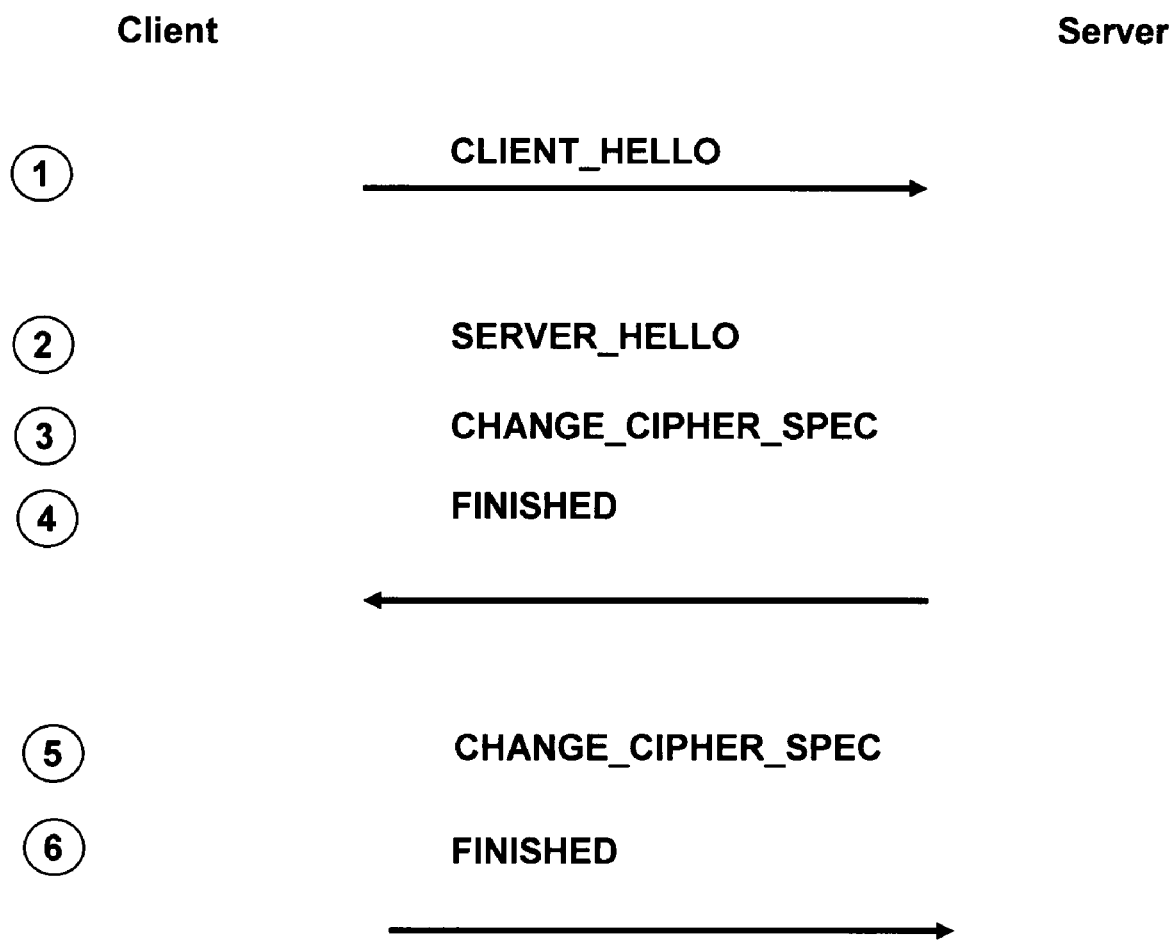
FIG. 9 is an SSL Handshake Flow for a Resumed Session.
Figure 10:
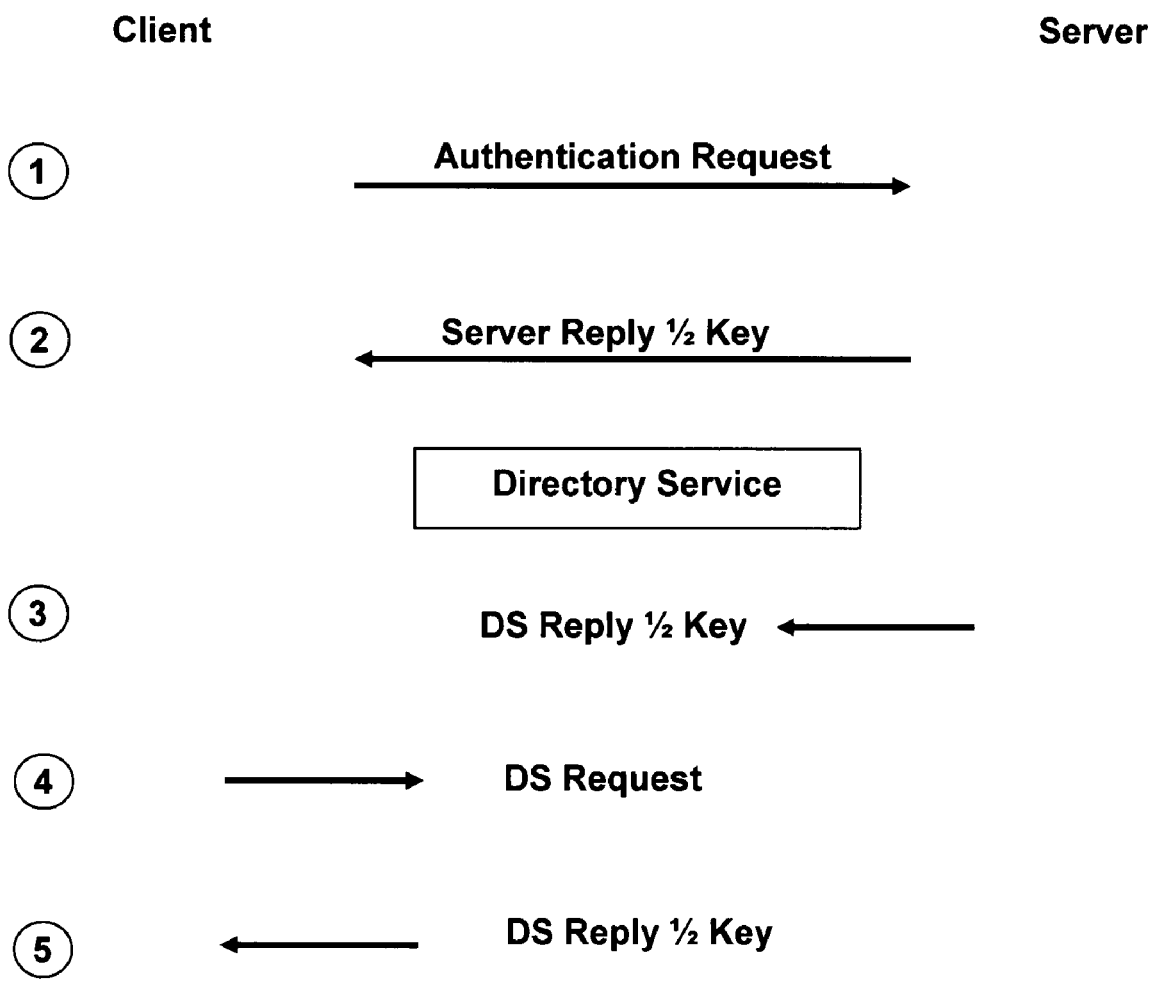
FIG. 10 is the SSLX Handshake Flow for a New Session according to yet another aspect of the present invention.

The last SSL session flow is the resumed session handshake, FIG. 9. In SSL, this entails both the browser and the server caching the last SSL information to shorten the interaction; and the reason for it is because a new handshake requires so much computational effort. SSLX does not need to replicate this flow, because even a resumed session SSL handshake takes more effort than a simple new SSLX Authentication Handshake—and the security of the two can't compare; see FIG. 10. The SSL resumed session handshake caches are a very serious security liability, whereas a new SSLX Authentication Handshake is not.

Data Element Definitions and Glossary

SSLX-EA Session Master Key (SMK)—A SSLX-EA 256-bit K1 key value used between a browser and a server (See SSLX-EA for details).

OpenID—Analogous to a Session ID; an open random 16-digit hex number assigned either per session or long term (used to identify browser and server components).

Key Distribution Center (KDC)—A data store of SSLX-EA keys, defined at minimum to retain the OpenIDs and associated SSLX-EA SMKs.

HTTPX://—The SSLX protocol.

Authentication Handshake (AH)—The method by which a browser may check and validate (verify) the identity of a web site (server). This process establishes the secure communications channel for browsers and servers who are 'unknown' to each other.

Normal Operation (Trusted)—The process by which a browser and server communicate securely after having established a trusted, keyed relationship (either by an AH or by an out-of-band distribution of SSLX keys).

Authentication Request (AR)—The start of an Authentication Handshake, sent from a browser to a web site server. It contains several pieces of information, some optional, including the SSF, a browser-generated public key, a Directory Service/Server's ID, etc.

Security Setting Flag (SSF)—A code value sent inside an AR that indicates the browser's configuration set security level for Authentication Handshakes (High, Medium, Low). There are different options for each SSF code, indicating the reply method from both the server and the DS.

Verified Set Up (VSU)—The process by which a browser and server validate (verify) their electronic identity to a Directory Service/Server (DS) for trusted third-party verification. This is one-time only action, which may be performed at multiple DSs, as well as reset at any DS already verified. Each server must perform at least one VSU to any public DS or the CDS; browsers may perform this process if desired.

Verified Set Up Request (VSUR)—The initial TCP request from a browser or web server that initiates the VSU process to a particular DS.

Directory Service/Server (DS)—A public entity that acts as a trusted switch by which browsers can verify the identity (and therefore trust) a web server. There can be any number of DSs, maintained and allocated by the SSLX Public Administrator.

DS Request (DSR)—The initial TCP request sent by a browser to a DS that completes an Authentication Handshake (AH).

DS Flag code (DSF)—A code value sent inside a VSUR that indicates the browser's configuration set security level for VSU processing (High, Medium, Low). There are different options for each DSF code, indicating the reply method from the DS.

DS Key (DSK)—A SSLX-EA 256-bit K1 key value used between a browser or server and a DS (obtained during a VSU).

SSLX Public Administrator (PA)—An independent governor of all the DSs, maintaining the list of public DSs as well as the policies and procedures for DS adherence.

What is claimed is:

1. A method for obtaining a session master key by an application executing on a computer from a server over a network comprising:
   sending by the application an open request to the server for the session master key;
   receiving a first reply by the application from the server with a first portion of the session master key, said first reply identifying a directory server from which a second portion of the session master key may be obtained;
   sending by the application an open request to the directory server specified by the server in the first reply for the second portion of the session master key; and
   receiving by the application from the directory server the second portion of the session master key.

2. The method according to claim 1, wherein said open request from the application to the server includes a public key and the first reply from the server to the application includes the first portion of the session master key encrypted with the public key.

3. The method according to claim 1, wherein said open request from the application to the directory server includes a public key and second portion of the session master key received from the directory server is encrypted with the public key.

4. The method according to claim 1, wherein said open request from the application to the directory server includes a designation either to: (i) wrap the second portion of the session master key in an SSLX-EA exchange using the application directory server key obtained by the application from the directory server; or (ii) encrypt the second portion of the session master key using a public key provided by the application in the open request to the directory server.

5. The method according to claim 1, further comprising:
   generating the session master key by the application using the first portion of the session master key received from the server and the second portion of the session master key received from the directory server.

6. The method according to claim 1, further comprising:
   sending by the server a second reply to the directory server with the second portion of the session master key wrapped in an SSLX-EA exchange using a server directory server key obtained by the server from the directory server.

7. The method according to claim 2, further comprising:
   sending messages from the application to the server wrapped in an SSLX-EA exchange using the session master key and receiving messages from the server wrapped in the SSLX-EA exchange using the session master key.

8. The method according to claim 1, wherein the server directory server key is obtained by the server during a verified set up operation with the directory server.

9. The method according to claim 1, wherein the application directory server key is obtained by the application during a verified set up operation with the directory server.

10. The method according to claim 1, wherein the open request from the application to the server includes a list of one or more directory servers with which the application has performed a verification process.

11. The method according to claim 1, wherein the first reply from the server to the application includes a list of one or more directory servers with which the server has performed a verification process.

12. A method for transferring a session master key from a server to an application executing on a computer over a network comprising:
   receiving an open request by the server from the application for the session master key;
   sending a first reply to the application with a first portion of the session master key; and
   sending a second reply to a directory server with a second portion of the session master key wrapped in an SSLX-EA exchange using a server directory server key obtained by the server from the directory server.

13. The method according to claim 12, further comprising:
   sending by the application an open request to the directory server specified by the server in the first reply for the second portion of the session master key.

14. The method according to claim 13, further comprising:
   sending by the directory server the second portion of the session master key to the application.

15. The method according to claim 14, further comprising:
   generating the session master key by the application using the first portion received from the server and the second portion received from the directory server.

16. The method according to claim 12, wherein the open request from the application to the server includes a list of one or more directory servers with which the application has performed a verification process.

17. The method according to claim 12, wherein the first reply from the server to the application includes a list of one or more directory servers with which the server has performed a verification process.

18. The method according to claim 12, wherein said open request received by the server from the application includes a public key and the first reply sent from the server to the application includes the first portion of the session master key encrypted with the public key.

19. The method according to claim 14, wherein said open request sent by the application to the directory server includes a public key and the second portion of the session master key sent from the directory server to the application is encrypted with the public key.

20. The method according to claim 12, wherein said open request sent by the application to the directory server includes a designation either to: (i) wrap the second portion of the session master key in an SSLX-EA exchange using the application directory server key obtained by the application from the directory server; or (ii) encrypt the second portion of the session master key using a public key provided by the application in the open request to the directory server.

21. The method according to claim 12, further comprising:
   sending messages to the application from the server wrapped in an SSLX-EA exchange using the session master key and receiving messages from the application wrapped in the SSLX-EA exchange using the session master key.

22. The method according to claim 12, wherein the server directory server key is obtained by the server during a verified set up operation with the directory server.

23. The method according to claim 12, wherein the application directory server key is obtained by the application during a verified set up operation with the directory server.

24. A method for verifying a computer on a network comprising:
  receiving an open request by a directory service from the computer for a directory service key, wherein the request includes an authentication request value;
  sending by the directory service a single reply with the directory service key encrypted using a public key included in the open request sent by the computer if the authentication request value designates a public key option;
  sending by the directory service a single message including the directory service key via an out-of-band communication path specified in the request from the computer if the authentication request value designates an out-of-band communication path option; and
  sending by the directory service a first reply back to the computer with a first portion of the directory service key, and a second reply via an out-of-band communication path specified in the request from the computer with the second portion of the directory service key if the authentication request value designates a combination of both public key and the out-of-band communication path option.

25. The method according to claim 24, wherein said single message comprises the directory service key encrypted using a public key included in the request from the computer to the directory service.

26. The method according to claim 24, wherein said second reply comprises the directory service key encrypted using a public key included in the request from the computer to the directory service.

27. The method according to claim 24, further comprising:
  receiving a confirmation message from the computer by the directory server, which confirmation message is wrapped in an SSLX-EA exchange using the directory service key.

28. A method for obtaining a trusted key from a trusted third party for use in communicating securely comprising:
  sending an open request to the trusted third party for the trusted key, wherein the request includes an authentication request value, and said authentication request value designates a delivery option for the trusted key;
  receiving the trusted key from the trusted third party via one or more communication paths based on the designation in the authentication request value; and
  sending a confirmation message to the trusted third party wrapped in an SSLX-EA exchange using the trusted key;
  said SSLX-EA exchange including:
    combining a plurality of selected digits of a random number with a plurality of selected digits of the trusted key to form an alphabet, wherein said combining includes:
      using a plurality of successive digits of the random number as a plurality of pointers into the trusted key to select the plurality of selected digits in the trusted key; and
      using a plurality of successive digits of the trusted key as a plurality of pointers into the random number to select the plurality of selected digits in the random number;
    extracting a message key from the alphabet by using successive digits of the trusted key as a plurality of pointers into the alphabet to select a plurality of digits of the alphabet to form the message key digits; and
  encrypting the confirmation message using the message key and including the random number used to generate the message key along with the encrypted confirmation message in unencrypted form.

29. The method according to claim 28, further comprising: creating a public and private key pair.

30. The method according to claim 28, further comprising: including a public key in the open request, which is used to encrypt the trusted key when sending the trusted key over said one or more communication paths.

31. The method according to claim 28, wherein if the authentication request value designates a public key option, the trusted third party sends a single reply with the trusted key wrapped using the public key sent to the trusted third party in the open request.

32. The method according to claim 28, wherein if the authentication request value designates an out-of band communication path option, the trusted third party sends a single reply with the trusted key sent via an out-of-band communication path to an address specified in the authentication request value.

33. A method for obtaining a trusted key from a trusted third party for use in communicating securely comprising:
  sending an open request to the trusted third party for the trusted key, wherein the request includes an authentication request value, and said authentication request value designates a delivery option for the trusted key;
  receiving the trusted key from the trusted third party via one or more communication paths based on the designation in the authentication request value; and
  sending a confirmation message to the trusted third party wrapped in an SSLX-EA exchange using the trusted key, wherein if the authentication request value designates a combination of both public key and out-of-band communication path, the trusted third party sends a first reply with a first portion of the trusted key encrypted using the public key, and a second reply via an out-of-band communication path and an address specified in the authentication request with the second portion of the trusted key.

34. The method according to claim 28, further comprising: decrypting by the trusted third party the confirmation message, wherein:
  if the confirmation message does not properly decrypt, the trusted third party sends a denied message encrypted with the public key; and
  decrypting the denied message by the computer and removing the trusted third party from a verified setup list.

35. The method according to claim 28, wherein after receiving the trusted key, the computer maintains a list of all trusted third parties with which the computer has received trusted keys, along with one or more associated trusted keys, and includes the list in a message to another computer when interacting with said another computer during an authentication process.

36. An apparatus for serving as a trusted intermediary between computers communicating securely over a network comprising:
  a server;
  a database coupled to the server to store pertinent information to securely communicate with any particular directory member, said pertinent information including a directory service key associated with each particular directory member;
  a known static IP address associated with the server;
  an application executing on the server, wherein:
    the server routes real-time requests from browsers to web servers and replies from web servers to browsers;

the requests and replies are secured with a requestor-generated public key or with a trusted key in an SSLX-EA exchange if the requestor has performed a verified set up with the server;

each of said replies includes only a portion of information for the requestor to combine and verify that said each reply and a web-connected location are identical; and a remaining portion of information is provided directly from the web site to the requestor using a requestor-generated public key to encrypt a remaining portion of information;

said SSLX-EA exchange including:
combining a plurality of selected digits of a random number with a plurality of selected digits of either the requestor-generated public key or the trusted key to form an alphabet, wherein said combining includes:
using a plurality of successive digits of the random number as a plurality of pointers into either the requestor-generated public key or the trusted key to select the plurality of selected digits in either the requestor-generated public key or the trusted key; and
using a plurality of successive digits of either the requestor-generated public key or the trusted key as a plurality of pointers into the random number to select the plurality of selected digits in the random number;

extracting a message key from the alphabet by using successive digits of either the requestor-generated public key or the trusted key as a plurality of pointers into the alphabet to select a plurality of digits of the alphabet to form the message key digits; and encrypting the requests and replies using the message key and including the random number used to generate the message key along with the encrypted requests and replies in unencrypted form.

* * * * *